United States Patent
Chitta et al.

(10) Patent No.: US 12,207,125 B2
(45) Date of Patent: Jan. 21, 2025

(54) MOBILE EDGE COMPUTING WITH LOW LATENCY TRAFFIC SEGREGATION WITHIN A PDN USING DEDICATED BEARERS

(71) Applicant: Cisco Technology, Inc., San Jose, CA (US)

(72) Inventors: Nithin Chitta, Pune (IN); Amit Ghadge, Pune (IN); Dishant Mukeshbhai Parikh, Gujarat (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/193,286

(22) Filed: Mar. 30, 2023

(65) Prior Publication Data
US 2023/0247473 A1 Aug. 3, 2023

Related U.S. Application Data

(62) Division of application No. 16/532,790, filed on Aug. 6, 2019.

(30) Foreign Application Priority Data

Jan. 29, 2019 (IN) .............................. 201921003519

(51) Int. Cl.
| | | |
|---|---|---|
| H04L 47/80 | (2022.01) | |
| H04L 47/20 | (2022.01) | |
| H04L 47/2441 | (2022.01) | |
| H04L 61/256 | (2022.01) | |
| H04W 28/02 | (2009.01) | |

(52) U.S. Cl.
CPC ......... *H04W 28/0252* (2013.01); *H04L 47/20* (2013.01); *H04L 47/2441* (2013.01); *H04L 61/2571* (2013.01); *H04W 28/0215* (2013.01)

(58) Field of Classification Search
None
See application file for complete search history.

(56) References Cited

U.S. PATENT DOCUMENTS

| | | |
|---|---|---|
| 8,665,717 B2 | 3/2014 | Kotecha et al. |
| 8,743,696 B2 | 6/2014 | Chowdhury |
| 8,861,535 B2 | 10/2014 | Koodli et al. |
| 9,432,258 B2 | 8/2016 | Van der Merwe et al. |

(Continued)

OTHER PUBLICATIONS

Cisco, "SaMOG Local Break Out", SaMOG Administration Guide, StarOS Release 20, https://www.cisco.com/c/en/us/td/docs/wireless/asr_5000/20/SaMOG/b_20-SaMOG-Admin/b_20-SaMOG-Admin_chapter_011.html, Aug. 8, 2016, 20 pages.

(Continued)

*Primary Examiner* — Willie J Daniel, Jr.
(74) *Attorney, Agent, or Firm* — Edell, Shapiro & Finnan, LLC

(57) ABSTRACT

Presented herein are embodiments that provide mobile edge computing (MEC) with low latency traffic segregation within a packet data network (PDN) using dedicated bearers. Techniques are provided that are performed at an edge user plane entity and a control plane entity to coordinate the directing of low latency traffic over a dedicated bearer broken out at the edge, and to communicate normal latency traffic over a default bearer that is centrally broken out.

20 Claims, 12 Drawing Sheets

(56) References Cited

U.S. PATENT DOCUMENTS

| | | | |
|---|---|---|---|
| 9,788,201 | B2 | 10/2017 | Stojanovski et al. |
| 9,973,966 | B2 | 5/2018 | Karampatsis et al. |
| 10,313,916 | B2 | 6/2019 | Wang et al. |
| 10,798,617 | B1 | 10/2020 | Ghadge et al. |
| 11,570,666 | B2 | 1/2023 | Ghadge et al. |
| 2008/0008183 | A1 | 1/2008 | Takagaki et al. |
| 2011/0075557 | A1 | 3/2011 | Chowdhury et al. |
| 2014/0078986 | A1 | 3/2014 | Kaippallimalil et al. |
| 2014/0286311 | A1 | 9/2014 | Sayeedi et al. |
| 2015/0195835 | A1 | 7/2015 | Lin et al. |
| 2016/0135072 | A1 | 5/2016 | Wang et al. |
| 2016/0183149 | A1 | 6/2016 | Stojanovski et al. |
| 2017/0104839 | A1 | 4/2017 | Starsinic et al. |
| 2017/0126618 | A1* | 5/2017 | Bhaskaran .......... H04L 61/5014 |
| 2017/0202005 | A1* | 7/2017 | Madan ................ H04W 72/542 |
| 2017/0230281 | A1 | 8/2017 | Newell |
| 2017/0245207 | A1* | 8/2017 | Stammers ............. H04W 76/12 |
| 2018/0041905 | A1 | 2/2018 | Ashrafi |
| 2018/0248787 | A1 | 8/2018 | Rajagopal et al. |
| 2018/0249317 | A1 | 8/2018 | Kurasugi et al. |
| 2018/0255463 | A1 | 9/2018 | Zheng et al. |
| 2018/0295659 | A1 | 10/2018 | Shan |
| 2018/0316606 | A1 | 11/2018 | Sung et al. |
| 2018/0352482 | A1 | 12/2018 | Gage et al. |
| 2018/0367322 | A1 | 12/2018 | Watanabe et al. |
| 2019/0037474 | A1 | 1/2019 | Xu et al. |
| 2019/0191343 | A1 | 6/2019 | Iwai et al. |
| 2019/0261213 | A1 | 8/2019 | Palnati |
| 2019/0273624 | A1 | 9/2019 | Hoffmann |
| 2019/0297655 | A1 | 9/2019 | Garneij et al. |
| 2019/0313285 | A1 | 10/2019 | Gottwerth et al. |
| 2020/0076875 | A1 | 3/2020 | Sabella et al. |
| 2020/0170003 | A1 | 5/2020 | Kim et al. |
| 2020/0374762 | A1 | 11/2020 | Ghadge et al. |

OTHER PUBLICATIONS

Brown, Gabriel, "Internet Offload for Mobile Operators", Sep. 2011, 15 pages.

S. Gundavelli, Ed. et al., "IPv4 Traffic Offload Selector Option for Proxy Mobile IPV6", Internet Engineering Task Force (IETF), Request for Comments: 6909, Category: Standards Track, ISSN: 2070-1721, Apr. 2013, 14 pages.

Sami Kekki et al., "MEC in 5G networks", ETSI White Paper No. 28, ISBN No. 979-10-92620-22-1, Jun. 2018, 28 pages.

3GPP Organizational Partners, "3rd Generation Partnership Project; Technical Specification Group Core Network and Terminals; Mobile radio interface Layer 3 specification; Core network protocols; Stage 3 (Release 15)", 3GPP TS 24.008 V15.4.0, Sep. 2018, 790 pages.

3GPP: "3rd Generation Partnership Project; Technical Specification Group Services and System Aspects; Architecture Enhancements for Control and User Plane Separation of EPC Nodes; Stage 2 (Release 15)," 3GPP TS 23.214 V15.5.0, Dec. 2018, 92 Pages.

3GPP: "3rd Generation Partnership Project; Technical Specification Group Services and System Aspects; General Packet Radio Service (GPRS) enhancements for Evolved Universal Terrestrial Radio Access Network (E-UTRAN) access Release 15)," 3GPP TS 23.401 V15.6.0, Dec. 2018, 411 pages.

3GPP: "3rd Generation Partnership Project; Technical Specification Group Services and System Aspects; General Packet Radio Service (GPRS) enhancements for Evolved Universal Terrestrial Radio Access Network (E-UTRAN) access (Release 16)," 3GPP TS 23.401 V16.1.0, Dec. 2018, 411 pages.

3GPP: "3rd Generation Partnership Project; Technical Specification Group Services and System Aspects; System Architecture for the 5G System; Stage 2 (Release 15)," 3GPP TS 23.501 V15.4.0, Dec. 2018, 236 Pages.

AT&T Business: "Redefine your Edge with A Future-Ready, Intelligent Mobile Network Architecture," 2019, 2 Pages.

Choi Y-I., et al., "Support for Edge Computing in the 5G Network," 2018 Tenth International Conference on Ubiquitous and Future Networks (ICUFN), IEEE, Jun. 25, 2018, 5 Pages.

Dongming Y., "Getting Closer to You: MEC@CloudEdge," Huawei Publications, Feb. 17, 2017, 9 Pages.

Ghadge A., "Cisco Ultra Packet Core Cups," Cisco, vt3, May 5, 2020, 25 Pages.

Hadzic I., et al., "Server Placement and Selection for Edge Computing in the ePC," IEEE Transactions on Services Computing, Sep.-Oct. 2019, vol. 12, No. 5, 14 Pages.

Samsung: "5G Core Vision," Samsung 5G Core Vision, Technical Report, vol. 1, 2019, 16 Pages.

Solozabal R., et al., "Exploitation of Mobile Edge Computing in 5G Distributed Mission-Critical Push-to-Talk Service Employment," IEEE Access, May 10, 2018, vol. 6, 11 Pages.

Sun Z., et al., "Building Dynamic Mapping with CUPS for Next Generation Automotive Edge Computing," IEEE 8th International Conference on Cloud Networking (CloudNet), 2019, 6 Pages.

\* cited by examiner

MOBILE EDGE COMPUTING WITH LOW LATENCY TRAFFIC SEGREGATION WITHIN A PDN USING DEDICATED BEARERS

PRIORITY CLAIM

This application is a divisional application of U.S. patent application Ser. No. 16/532,790, filed Aug. 6, 2019, which claims the benefit of foreign priority to Indian Provisional Patent Application No. 201921003519, filed Jan. 29, 2019, the entireties of which are incorporated herein by reference.

TECHNICAL FIELD

The present disclosure relates to a communication system, in particular, to mobile edge computing with low latency traffic segregation within a packet data network (PDN) using dedicated bearers.

BACKGROUND

Mobile networking architectures have grown increasingly complex in communication environments. In some cases, mobile network architectures can be implemented using Software Defined Network (SDN) techniques in order to deploy Control and User Plane Separation (CUPS) architectures in which the data path and the control path for a mobile network are split across two planes, a user plane and a control plane. As the number of user equipment increases and as CUPS architectures become more prevalent for mobile networking deployments, efficient management of communication resources becomes more critical. Accordingly, there are significant challenges in facilitating CUPS architectures for a network environment.

DESCRIPTION OF EXAMPLE EMBODIMENTS

Overview

Figure 1:
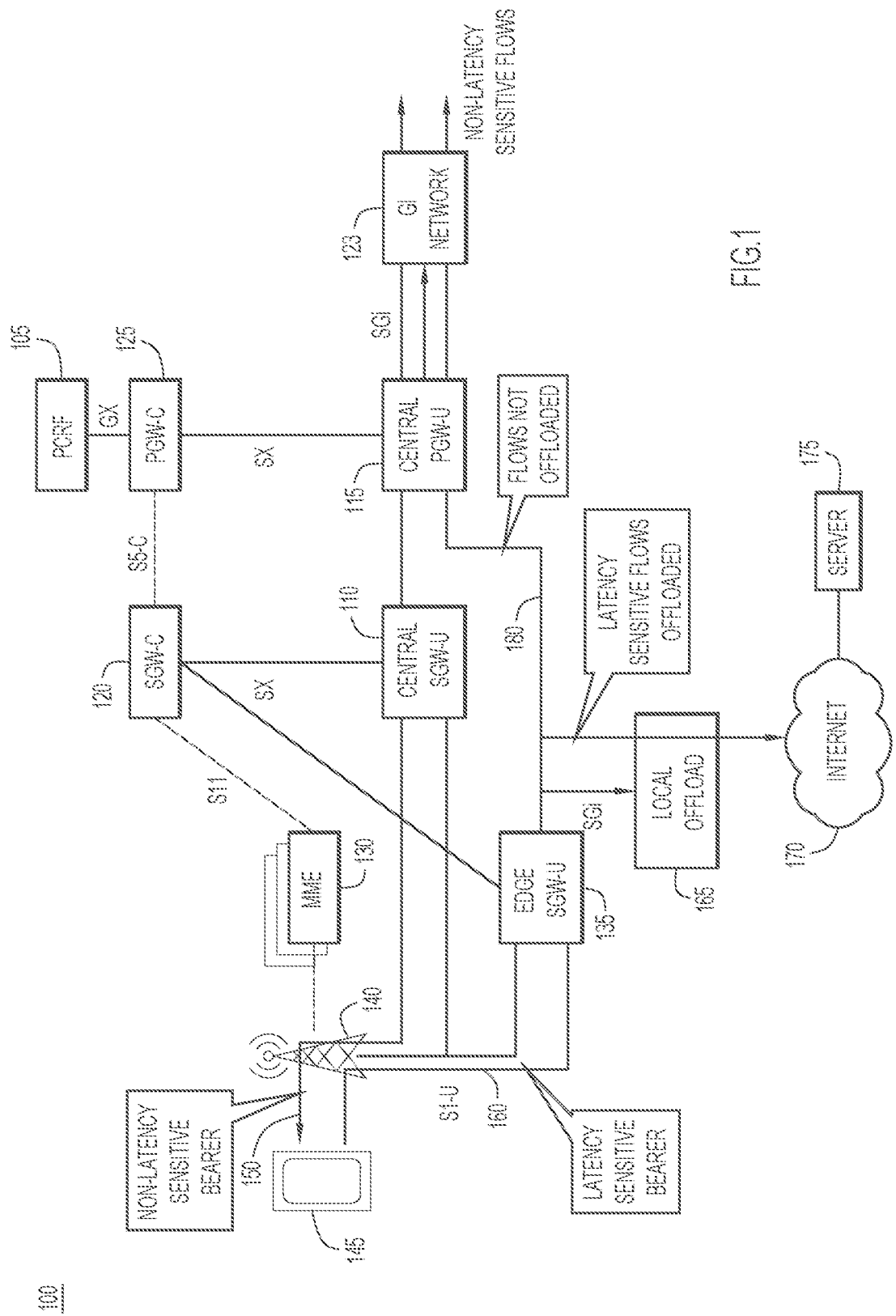
FIG. 1 is a block diagram of a mobile network architecture in which techniques are provided for mobile edge computing (MEC) with low latency traffic segregation within a packet data network (PDN) using dedicated bearers, according to an example embodiment.

Mobile Edge Computing (MEC) is enabled by Control and User Plane Separation (CUPS). CUPS enables Operators to have user planes hosted at the edge so that traffic can be offloaded at the edge and ultra-low latency requirement can be met. Normally at the edge the compute resources are costly and scarce. It is needed to ensure that traffic being handled by the user plane at the edge is genuinely traffic that needs low latency support.

Presented herein are techniques to provide low latency traffic segregation for Mobile Edge Computing (MEC) using dedicated bearers. In one form, a method is provided that is performed by an edge user plane entity in a mobile network. The edge user plane entity obtains from a control plane entity, one or more rules for classifying traffic from a user equipment device as low latency traffic to be directed over a dedicated bearer for local breakout by the edge user plane entity to a data network. The edge user plane entity obtains a packet sent by the user equipment device and received by a base station. The edge user plane entity applies the one or more rules to the packet to determine whether the packet is associated with a packet flow that is low latency traffic. When the packet is determined to be associated with a packet flow that is low latency traffic, the edge user plane entity directs the packet over the dedicated bearer for local breakout by the edge user plane entity to the data network. When the packet is determined not to be associated a packet flow that is low latency traffic, the edge user plane entity directs the packet over a default bearer for central breakout to the data network.

In another embodiment, a method is provided that is performed by a control plane entity in a mobile network. The control plane entity provides to a policy and charging rules function, a notification indicating support for low latency traffic segregation using a dedicated bearer. The control plane entity obtains from the policy and charging rules function one or more rules for classifying traffic from a user equipment device as low latency traffic to be directed over a dedicated bearer for local breakout by an edge user plane entity to a data network. The control plane entity provides the one or more rules to the edge user plane entity to enable the edge user plane entity to direct packets determined to be associated with a low latency packet flow over the dedicated bearer for local breakout to a data network and to direct packets determined not to be associated with a low latency packet flow over a default bearer for central breakout to the data network.

Example Embodiments

For purposes of understanding certain embodiments of systems and architectures disclosed herein, it is important to appreciate the technologies and data that may be associated with network communications for 3rd Generation Partnership Project (3GPP) Long Term Evolution (LTE) Evolved Packet Core (EPC) system architectures, sometimes referred to as 4th Generation (4G)/LTE architectures. The following foundational information may be viewed as a basis from which the present disclosure may be properly explained.

Architectures that facilitate network communications generally rely upon three basic components: a data or user plane, a control plane, and a management plane. Typically, the user plane carries data traffic (e.g., user data traffic), while the control plane and the management plane serve the data plane. As referred to herein and in the claims, the term 'plane' can refer to a separation of traffic, functionality, and/or operations of a network.

Compute node(s) having hardware and software resources that can be abstracted into one or more logical layers can also be used to facilitate building and deploying Software Defined Network (SDN) architectures for virtualized network environments. Generally, SDN architectures provide an approach to building and deploying computer networks, networking equipment and software that separates and abstracts the control plane and user plane of networking systems. SDN decouples the control plane that makes decisions about where traffic is sent from the underlying user plane that forwards traffic to a selected destination. SDN allows network administrators, operators, etc. to manage network services through abstraction of lower level functionality into a virtualized network environment. In various embodiments, a compute node can include, but not be limited to: a data center compute node such as a server, rack of servers, multiple racks of servers, etc. for a data center; a cloud compute node, which can be distributed across one or more data centers; among others.

As referred to herein in this disclosure, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, element, module, aggregator, combinations thereof or the like as described herein may execute (e.g., be instantiated to perform one or more operation(s)) via a hypervisor-based virtualization or a container-based virtualization of one or more compute node(s) using the compute node(s)' hardware (e.g., processor, memory, network interfaces, etc.), software and/or operating system for a given virtualized network environment.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Communications in a network environment can be sent and received according to any suitable communication protocols. Suitable communication protocols can include a multi-layered scheme such as the Open Systems Interconnection (OSI) Model, or any derivations or variants thereof. Within a network architecture or environment, Internet Protocol (IP) addresses for any element in the network environment can be assigned using Dynamic Host Configuration Protocol (DHCP), Stateless Address Auto-configuration (SLAAC), during default bearer activation processes, etc., or any suitable variation thereof. IP addresses discussed herein and in the claims can include IP version 4 (IPv4) and/or IP version 6 (IPv6) addresses.

In traditional 3GPP 4G architectures, user equipment (UE) devices typically connect to a service provider network through over-the-air communications with one or more radio nodes such as evolved Node Bs (eNodeBs or eNBs), which interface with control plane elements such as Mobility Management Entities (MMEs) and user plane elements such as Serving Gateways (SGWs) and Packet Data Network (PDN) Gateways (PGWs). In some 4G architectures, S2a over General Packet Radio System (GPRS) Tunneling Protocol (GTP) Mobility Gateways (SAMOGs) may be provided. As referred to herein and in the claims, the terms 'UE device', 'UE', 'mobile station', 'subscriber', 'user', and variations thereof can be used interchangeably.

User plane elements such as SGWs can route and forward user data packets while also acting as a mobility anchor for inter-3GPP mobility and during inter-eNodeB handoffs or handovers. Further for traditional 3GPP 4G architectures, PGWs may provide UE connectivity to external Access Point Names (APNs), such as the Internet, an IP Multimedia Subsystem (IMS), combinations thereof, or the like. A PGW can serve as a policy enforcement point to manage Quality of Service (QoS), flow classification, online/offline flow-based charging, data generation, shallow packet inspection, deep packet inspection (DPI), packet filtration, intercept, combinations thereof or the like.

SDN concepts can be applied to a traditional 3GPP 4G architecture to enable separation of the control and user planes in order to implement a Control and User Plane Separation (CUPS) architecture in which the control and user paths are split across the two planes thereby creating a control plane (CP) implemented via one or more controller elements and a user plane (UP) implemented via one or more forwarding elements (FEs). For a 3GPP 4G CUPS architecture, the control plane elements can include any number of control plane SGWs (referred to herein as SGW-Cs) and control plane PGWs (referred to herein as PGW-Cs) that manipulate the user plane network infrastructure to facilitate end-to-end service provider network connectivity. Also for a 3GPP 4G CUPS architecture, the user plane FE(s) can include any number of user plane SGWs (referred to herein as SGW-Us) and user plane PGWs (referred to herein as PGW-Us) that can process and perform operations on subscriber (e.g., UE) traffic as the traffic passes through the service provider network. In some embodiments, functionality for the SGWs and PGWs can be combined to provide a System Architecture Evolution Gateways (SAEGWs), which can be implemented in a CUPS architecture as control plane SAEGWs (referred to herein as SAEGW-Cs) and user plane SAEGWs (referred to herein as SAEGW-Us).

As noted previously, Mobile Edge Computing (MEC) is enabled by CUPS, which allows mobile network operators to have user planes hosted (e.g., instantiated) at the edge of a mobile network. MEC provides for the ability to offload latency sensitive traffic at the edge of a mobile network.

There are many cases in which it may useful to offload latency sensitive traffic at the mobile network edge. In some cases, for example, it may be useful to offload latency sensitive traffic at the mobile network edge in order to meet 3 GPP ultra low latency requirements. In other cases, such as within an APN, such as the Internet APN, a network operator may want to segregate low latency traffic based on application type within that APN, or to tie up with a content provider (e.g., Netflix™, Hulu™, Amazon™, etc.) to provide a better customer experience.

Still other latency sensitive applications include online gaming that involve augmented reality/virtual reality (AR/VR) that use a thin client on a mobile device, financial transactions, factories, etc. In the case of factories, modular stages may be employed by providing ultra-low latency, reliable and secure low cost virtual local area networks for automation, network interconnecting sensors, controllers, actuators, etc. In addition, private enterprise networks (such as for hospitals, retail, stadiums, factories) may employ low latency to provide a reliable and secure perimeter within which low latency applications operate (communication with low latency permitted as long as it is within a perimeter). Furthermore, low latency applications may enable large data collection or downloading by supporting a local break out of low latency (e.g., 1-10 ms).

SGW CUPS control plane ensures that for low latency bearer, it selects a UP closer to the edge.

While it may be useful to offload low latency traffic at the network edge, compute resources at the edge are often costly and scarce. Thus, it is important to ensure that traffic being handled by the user plane at the edge is genuinely traffic that needs low latency support.

Currently, MEC is achieved in the following ways:

Option 1: One option is to have separate APNs for low latency traffic and non-latency traffic. With one APN PDN hosted on the UP at the edge and the other one at the centralized UP. For this option, however, there is a need to have two different APNs and, thus, two PDNs. This option doesn't help when the low latency traffic and the non-latency sensitive traffic belong to the same APN.

Option 2: Another option is to have one APN for both types of traffic and have the whole traffic for a subscriber be handled by the SGW/SAMOG user plane at the edge and offload some flows at the edge, while the rest of the traffic is carried to the centralized UP of the centralized PGW. However, this option can lead to having the UP at the edge processing lots of traffic and, thus, needing lots of resources and becoming costly.

Example embodiments described herein provide techniques to overcome these hurdles to allow operators to have the ability to segregate traffic, within a PDN connection, the low latency traffic from the rest of the non-latency sensitive traffic, so that only the genuine low latency traffic is processed on the edge user plane. The rest of the non-latency sensitive traffic goes to a centralized user plane function.

Segregation may be provided in the same PDN in which the segregation may be done by splitting the low-latency and non-low latency traffic amongst different bearers. Different user planes are then used for low latency and for non-latency traffic.

For example, traffic is segregated into two different sets of bearers. One set for low latency traffic and the other set for non-latency sensitive traffic. An operator packet core will trigger dedicated bearers for low latency based on need and anchor the SGW portion of those bearers at the edge UP. In one form, Low latency bearer setup is triggered once the default bearer has been setup or later (using PGW Initiated Create Bearer Request procedure) based on policy triggers. Normal latency traffic goes to a centralized UP.

Techniques provided by example embodiments described herein may provide for the ability to segregate the traffic for the same APN and help ensure only the low latency sensitive traffic is handled by the UP at the edge.

In at least one embodiment, techniques described herein may be applied on top of 3GPP defined standards and may include extending 3GPP protocols to carry additional information that may facilitate the ability to provide a flexible and dynamic solution that lessens impacts on 3GPP network functions. For example, embodiments described herein may include extending control plane GTP (referred to herein as GTP-C) signaling and Gx interface signaling with attribute-value pair (AVP) private extensions and/or information element (IE) private extensions to carry additional information that facilitates low latency traffic segregation at the mobile network edge. Further, techniques described herein may provide a network operator with complete control for enabling of low latency traffic segregation features rather than allowing them to be UE driven.

In accordance with embodiments described herein, techniques that provide MEC with low latency traffic segregation within a PDN using dedicated bearers may impact various network elements and/or nodes including: SGW/PGW CUPS control plane and Policy and Charging Rules Function (PCRF).

A goal of techniques described herein is to have two sets of bearers setup a PDN, one set of bearers carrying the low latency traffic and the other carrying the non-latency sensitive traffic. Techniques described herein may be implemented using different mobile network architectures. Example details associated with a first mobile network architecture in which techniques that provide MEC with low latency traffic segregation within a PDN using dedicated bearers may be implemented are illustrated in FIGS. 1 and 2A-2C, according to example embodiments. For the first mobile network architecture, a default bearer is provided at the central SGW-U and a dedicated bearer is provided at the Edge-SGW-U, according to an example embodiment.

Example details associated with a second mobile network architecture in which techniques that provide MEC with low latency traffic segregation within a PDN using dedicated bearers may be implemented are illustrated in FIGS. 3 and 4A-4D. For the second mobile network architecture, a default bearer is provided at a central SGW-U+PGW-U and a dedicated bearer is provided at an edge SGW-U+PGW-U, according to an example embodiment.

Referring to FIG. 1, a simplified diagram is provided that illustrates example details associated with a mobile network architecture 100 in which techniques that provide MEC with low latency traffic segregation within a PDN using dedicated bearers may be implemented, according to an example embodiment. The mobile network architecture 100 shown in FIG. 1. includes a PCRF 105, a central SGW-U 110, a central PGW-U 115, an SGW-C 120 and a PGW-C 125. The central SGW-U 110 is in communication with the SGW-C 120 via the Sx interface and with the central PGW-U 115. The central PGW-U 115 is in communication with the PGW-C 125 via the Sx interface. The central PGW-U 115 is also in communication with a Gi network 123. The SGW-C 120 and the PGW-C 125 are in communication with each other via the S5-C interface. The PGW-C 125 is in communication with the PCRF 105 via the Gx interface. The mobile network architecture 100 further includes one or more MMEs 130, an Edge SGW-U 135, an eNB 140 that is in wireless communication with a UE 145. The SGW-C 120 may communicate with the one or more MMEs via the S 11 interface. The Edge SGW-U 135 may be in communication with the eNB 140 via the S1-U interface.

FIG. 1 shows at 150 a default bearer for non-low latency traffic is provided and the non-latency sensitive bearer 150 is directed to the central SGW-U 110 and central PGW-U 115. By contrast, a dedicated bearer for low latency traffic, shown at 160, is provided that is directed to the Edge-SGW-U 135 for local offload, as shown at 165, to the Internet 170, for example, so as to communicate with a server 175. Furthermore, as shown in FIG. 1, not all flows handled by the dedicated bearer 160 will be locally offloaded. Some flows, as shown at 180 carried by the dedicated bearer 160 may be directed to the central PGW-U 115 and handled like other non-latency sensitive flows.

In at least one embodiment of the mobile network architecture 100 illustrated in FIG. 1, low latency bearers will have an SGW portion of the bearer anchored on the Edge SGW-U 135, while the non-latency sensitive bearers are anchored by central SGW-U 110. The Edge SGW-U supports Local Breakout (LBO) of flows that need to be offloaded at the edge. To do LBO at Edge SGW-U 135, network address translation (NAT) is performed for offloaded flows, while the rest of the flows will go to the central PGW-U 115, as described above. The operator Packet Core will trigger the dedicated bearers for low latency traffic based on the need to have low latency traffic segregation. The Packet Core can trigger low latency bearer setup once the default bearer has been setup or may trigger low latency setup later (e.g., using a PGW initiated Dedicated Create Bearer Request procedure). The SGW-C 120 will ensure that for low latency bearers, a User Plane is selected closer to the edge, while for the non-latency sensitive bearers a centralized User Plane is selected. The PGW-C 125 notifies the PCRF 105 about low latency bearers, so that the PCRF 105 can activate Policy and Charging Control (PCC) rules pertaining to low latency on low latency bearers and the rest of the PCC rules on non-latency sensitive bearers. These PCC rules ensure that the appropriate traffic type goes to their respective type of bearers.

Figure 2A:
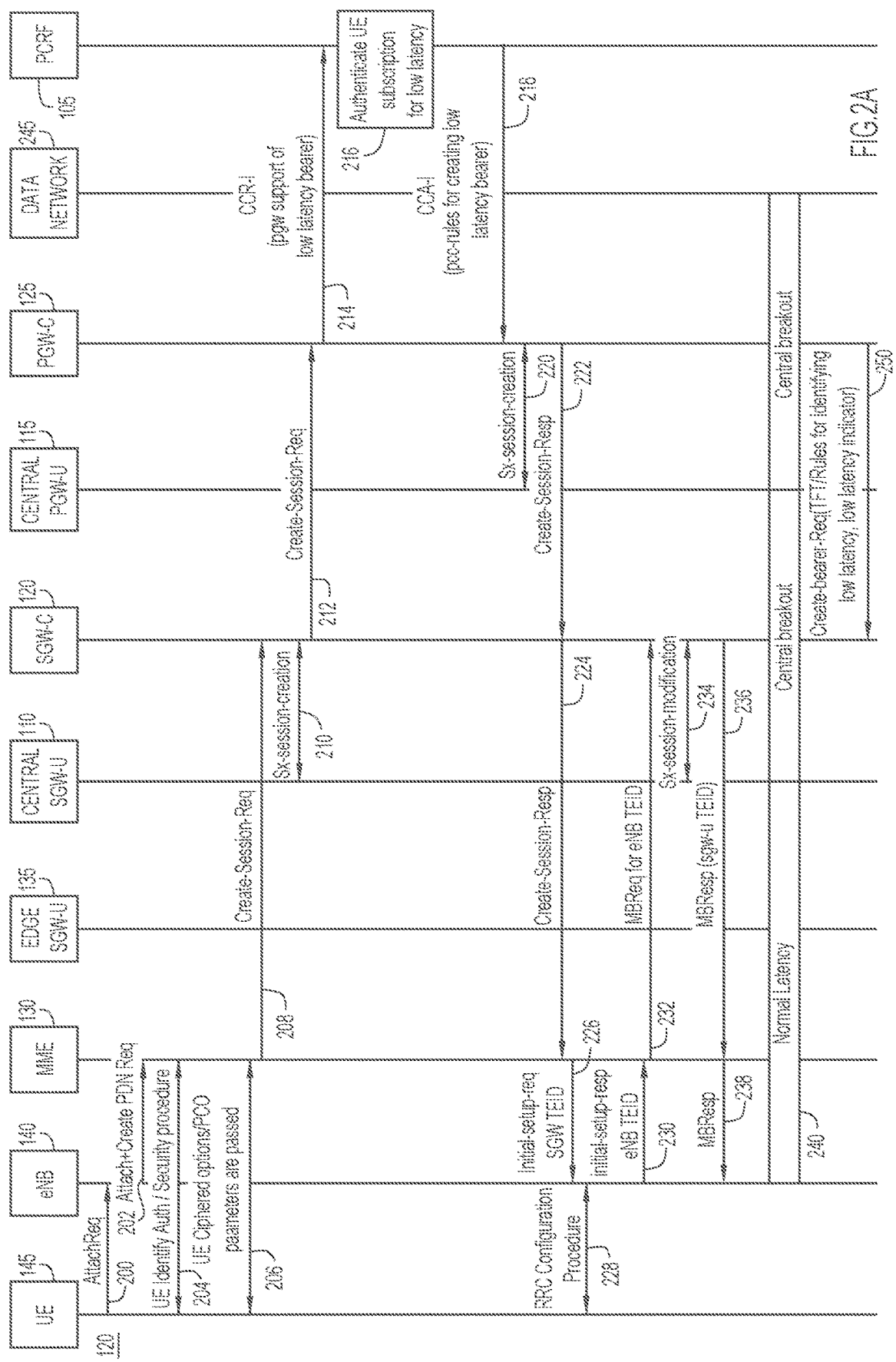
FIGS. 2A-2C illustrate a call flow for a process to enable segregation of low latency traffic on dedicated bearers in the mobile network architecture depicted in FIG. 1, according to an example embodiment.
Figure 2B:
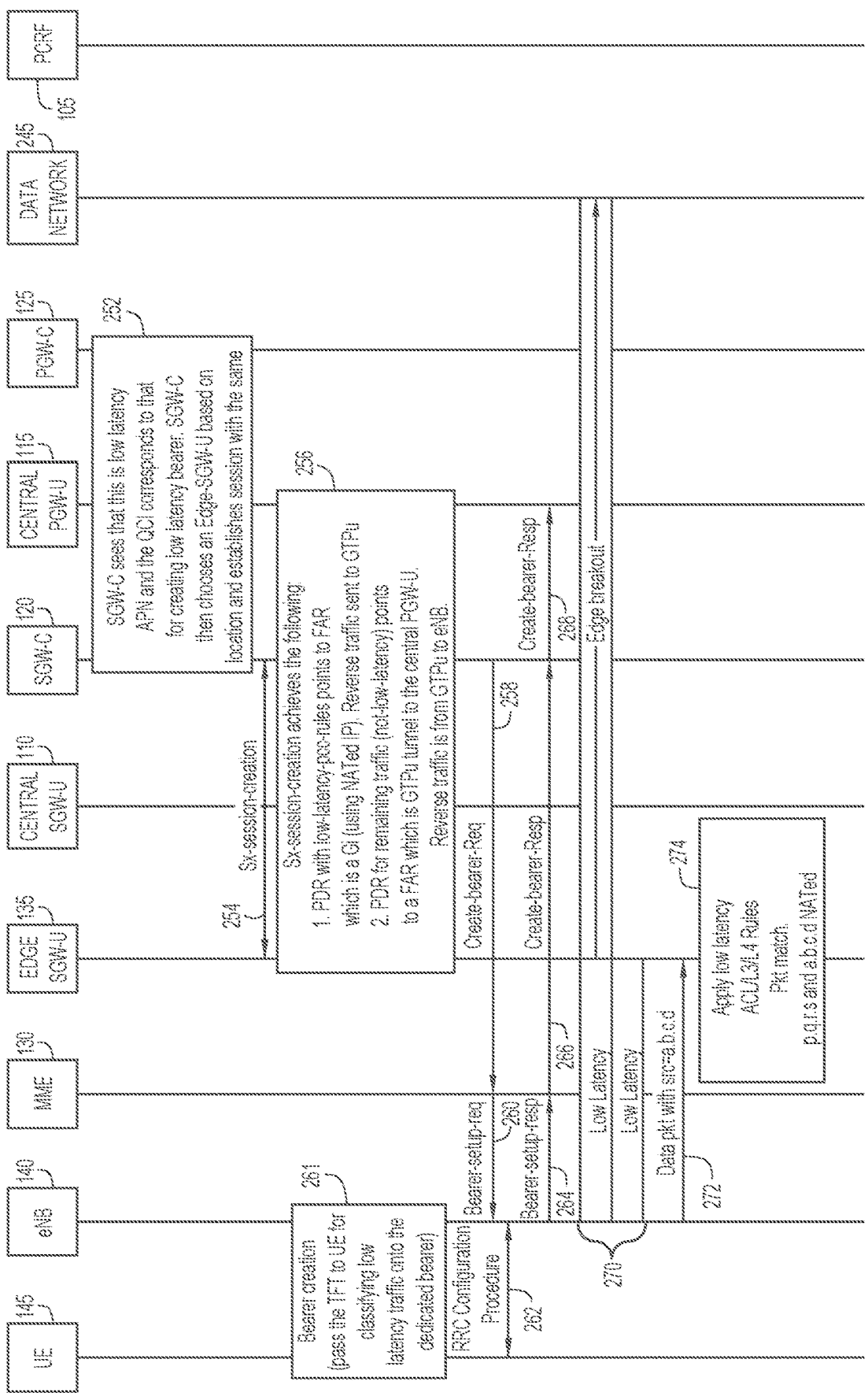
Figure 2C:
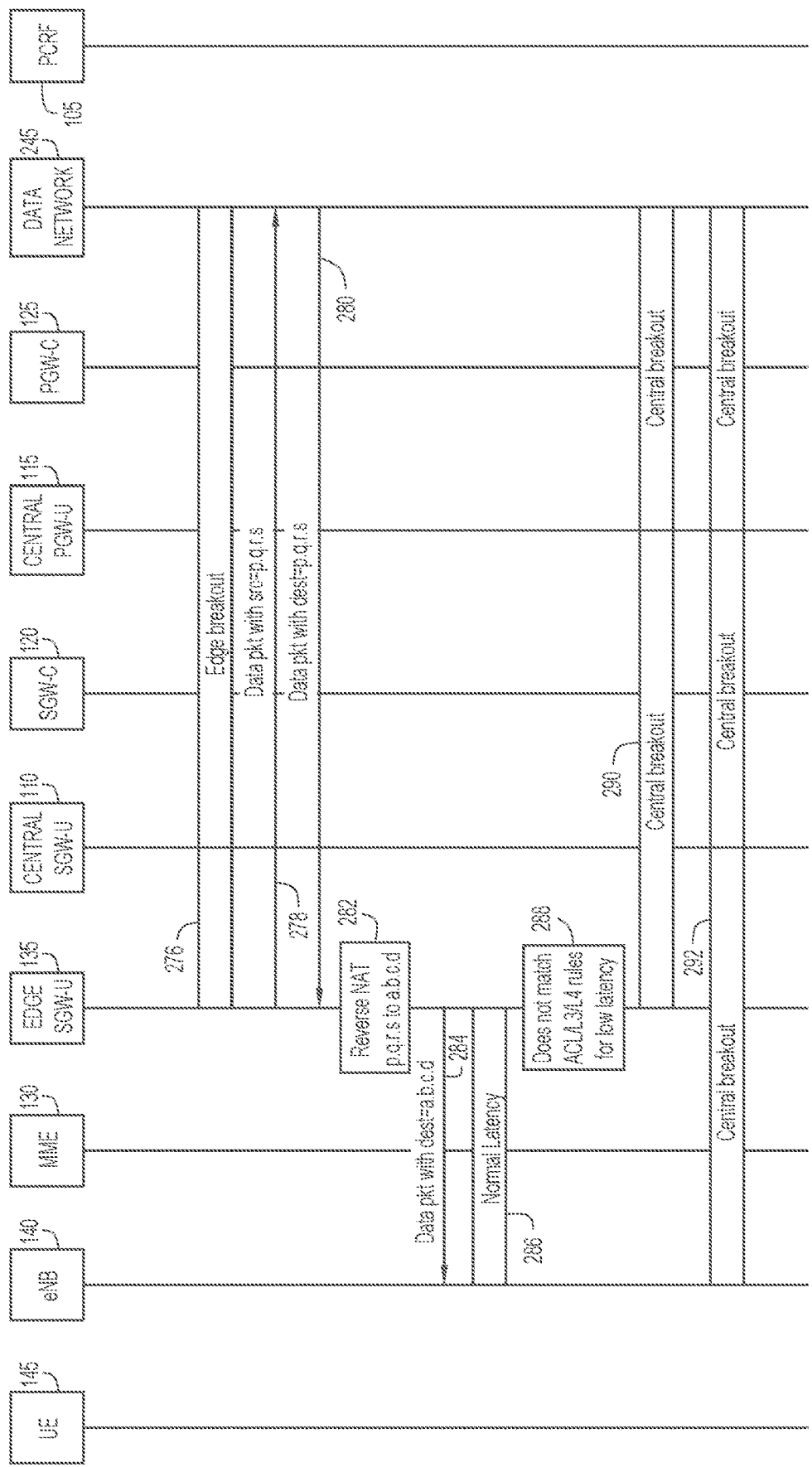

Referring now to FIGS. 2A-2C, a simplified sequence diagram is now described that illustrates example interactions and operations associated with techniques that provide MEC with low latency traffic segregation within a PDN using dedicated bearers using the mobile network architecture, according to an example embodiment.

The process of FIGS. 2A-2C beings with the UE 145 attaching to the network in a normal manner. This is shown by the Attach Request (AttachReq) 200 that the UE sends to the eNB 140. The eNB, at 202, sends to the MME 130 an Attach and Create PDN session. At 204, the MME 130 engages in an identity authentication/security procedure with the UE 145 via the eNB 140. At 206, the UE ciphered options/Protocol Configuration Options (PCO) are passed between the UE 145 and MME 130.

At 208, the MME 130 sends a Create-Session Request to the SGW-C 120. The SGW-C 120 engages in an Sx session-creation at 210 with the central SGW-U 110. At 212, the SGW-C 120 sends a Create-Session Request to the PGW-C 125 to set up a default bearer for the UE 145. While setting up the default bearer, at 214, the PGW-C 125 notifies (using a private Attribute-Value-Pair (AVP) over Gx in a Credit-Control-Request-Initial Request (CCR-I)) the PCRF 105 about support for low latency traffic segregation using dedicated bearers. At 216, the PCRF 105 uses this information (that the network supports low latency traffic segregation) together with subscriber subscription and Operator policy information, and determines the PCC rules to activate for the UE. Thus, the UE's subscription for low latency dedicated bearer service is authenticated (or not) at 216. At 218, the PCRF 105 sends the PCC rules for low latency traffic with appropriate Quality of Service (QoS). The PCC rules sent at 218 may be in a Credit-Control-Answer Initial (CCA-I) message, with each PCC rule having an indication (e.g., using a private AVP in a rule definition) of the rule being a low latency traffic rule. The PCC rules specify the criteria under which traffic is to be classified (and treated) as low latency with a dedicated bearer, etc. For example, the PCC rules may specify that if traffic is sent on a certain port or is from one particular IP address to another particular IP address, then the traffic is classified as low latency. In general, the PCC rules may specific packet flow parameters in a form of an access control list, layer 3 parameters, and/or layer 4 parameters.

At 220, the PGW-C and the central PGW-U 115 engage in an Sx session creation, selecting the central PGW-U 115 for the PDN session for the UE. At 222, the PGW-C 125 sends back the Create-Session Response to the SGW-C 120. The SGW-C 120 selects the central SGW-U 110 for the default bearer and sets up the default bearer. At 224, the SGW-C 120 conveys the Create-Session Response back to the MME 130. The MME 130 completes default bearer set up.

At 226, the MME 130 sends an Initial-Setup-Request to the eNB 140 and provides an SGW Tunnel Identifier (TEID). The eNB 140 and UE 145 engage in a Radio Resource Control (RRC) Configuration Procedure at 228. The eNB then sends an Initial-Setup-Response with the eNB TEID to the MME 130, at 230. At 232, the MME 130 sends an MBReq for eNB TEID to the SGW-C 120. The SGW-C 120 and the central SGW-U 110 engage in Sx Session-Modification at 234. The SGW-C sends an MBResp (with SGW-U TEID) to the MME 130 at 236, and at 238, the MME sends the MB Resp to the eNB 140.

It should be noted that operations 220-230 are in accordance with 3GPP TS 23.401. No changes are made to the eNB 140 or UE 145.

As shown at 240 in FIG. 2A, a default bearer is established for normal latency traffic of the UE 145 and this traffic is broken out at the central PGW-U 115 to a data network 245.

At some point in time, at 250, the PGW-C 125 initiates the dedicated bearer setup for low latency traffic (using the Create Bearer Request (CBReq) procedure) based on either obtaining the low latency PCC rules in a CCA-I message at 218 from the PCRF 105, or in Re-Auth Request (RAR) message from the PCRF 105 or in CCA update (CCA-U) message from the PCRF 105. The CBReq message carries an indication that the bearer is a dedicated bearer for low latency traffic. The CBReq message also includes Traffic Flow Template (TFT) rules (packet flow parameters) for identifying low latency traffic.

Reference is now made to FIG. 2B. At 252, the SGW-C detects a traffic flow that is low latency based on the APN and the QoS Class Identifier (QCI) associated with the traffic. The SGW-C selects an edge SGW-U for the low latency traffic, e.g., Edge SGW-U 135, to locally breakout the traffic, based on location of the Edge SGW-U 135 relative to the eNB 140, and establishes a session. Thus, at 254, the SGW-C 120 and the Edge SGW-U 135 engage in an Sx Session Creation.

As indicated at 256 in FIG. 2B, Sx Session-Creation achieves the following:
1. Packet Detection Rule (PDR) with low latency PCC rules pointing to a Forwarding Action Rule (FAR) that is in a Gi Network using a Network Address Translated (NAT'ed) IP address. Reverse traffic back to the UE 145 is sent to the GPRS Tunneling Protocol User Plane (GTP-U) address.
2. The PDR for remaining traffic (not low-latency) points to a FAR which is a GTP-U tunnel to the central PGW-U 115. Reverse traffic is from the GTP-U to the eNB 140.

At 258, the SGW-C 120 relays the CBReq to the MME 130 and then at 260 the MME sends the CBReq to the UE 145 via eNB 140. Bearer creation resulting from operation 260 results in the eNB 140 passing to the UE 145 the TFT rules for classifying low latency traffic onto the dedicated bearer, as shown at 261 in FIG. 2b.

At 262, the eNB 140 and the UE 145 engage in an RRC configuration procedure. At 264, the eNB sends a bearer setup response to the MME 130, which in turn forwards it to the SGW-C 120 at 266, which then forwards it to the PGW-C 125 at 268. At this point, based on the operations 262-268, the dedicated bearer for low latency traffic has the packet filters for low latency traffic, and this is conveyed to UE 145 as well so that the UE 145 too can appropriately send the traffic on respective bearers. As shown at 270, the dedicated low latency bearer is set up for locally breaking out low latency traffic at the Edge SGW-U 135.

For example, at 272, a data packet from the UE 145 is forwarded by the eNB to the Edge SGW-U 135. The data packet has a source (src) address "a.b.c.d". At 274, the Edge SGW-U 135 applies low latency ACL/L3/L4 rules and determines a packet match to one of the rules that indicates a NAT from "a.b.c.d" of the src address to "p.q.r.s" (the address of the Edge SGW-U 135) and is to be sent via the local/edge breakout as shown at 276 in FIG. 2C. Specifically, as shown in FIG. 2C, at 278, the Edge SGW-U 135 sends the data packet the edge breakout to the data network 245, with the source address of the data packet changed to "p.q.r.s". At 280, a return packet as part of this same packet flow/session from the data network 245 is sent back to the address "p.q.r.s" to the Edge SGW-U 135, and the Edge SGW-U 135, at 282, reverse-NAT's the packet to obtain the address "a.b.c.d", the address of the UE 145. The Edge SGW-U 135 sends the packet to the eNB 140 at 284.

Handling of normal latency traffic is shown at 286. The Edge SGW-U 135, at 288, determines that traffic received from the eNB 140 does not match the ACL/L4/L3 rules for low latency treatment. Thus, as shown at 290, the Edge SGW-U 135 forwards on the traffic to the central PGW-U 115 for over the default bearer for central breakout. As shown at 292, inbound non-low latency traffic from the data network 245 is received at the PGW-U 115, which forwards it over the default bearer to the central SGW-U 110, which forwards the non-low latency traffic to the eNB 140.

As per 3GPP standards, a SGW-C uses the same SGW-U for all the bearers of a PDN. However, as part of this solution, the SGW-C will have a different UP function for different dedicated bearers. This is entirely new, and will lead to the SGW-C having multiple UPs being used to anchor different dedicated bearers of a PDN.

In one embodiment, the SGW-C is configured to aggregate traffic statistics and consolidate statistics from different UPs for different bearers. Associated charging functions are accordingly adapted. Moreover, lawful intercept (LI) is adjusted to ensure that data intercepts are made for all the bearers.

Figure 3:
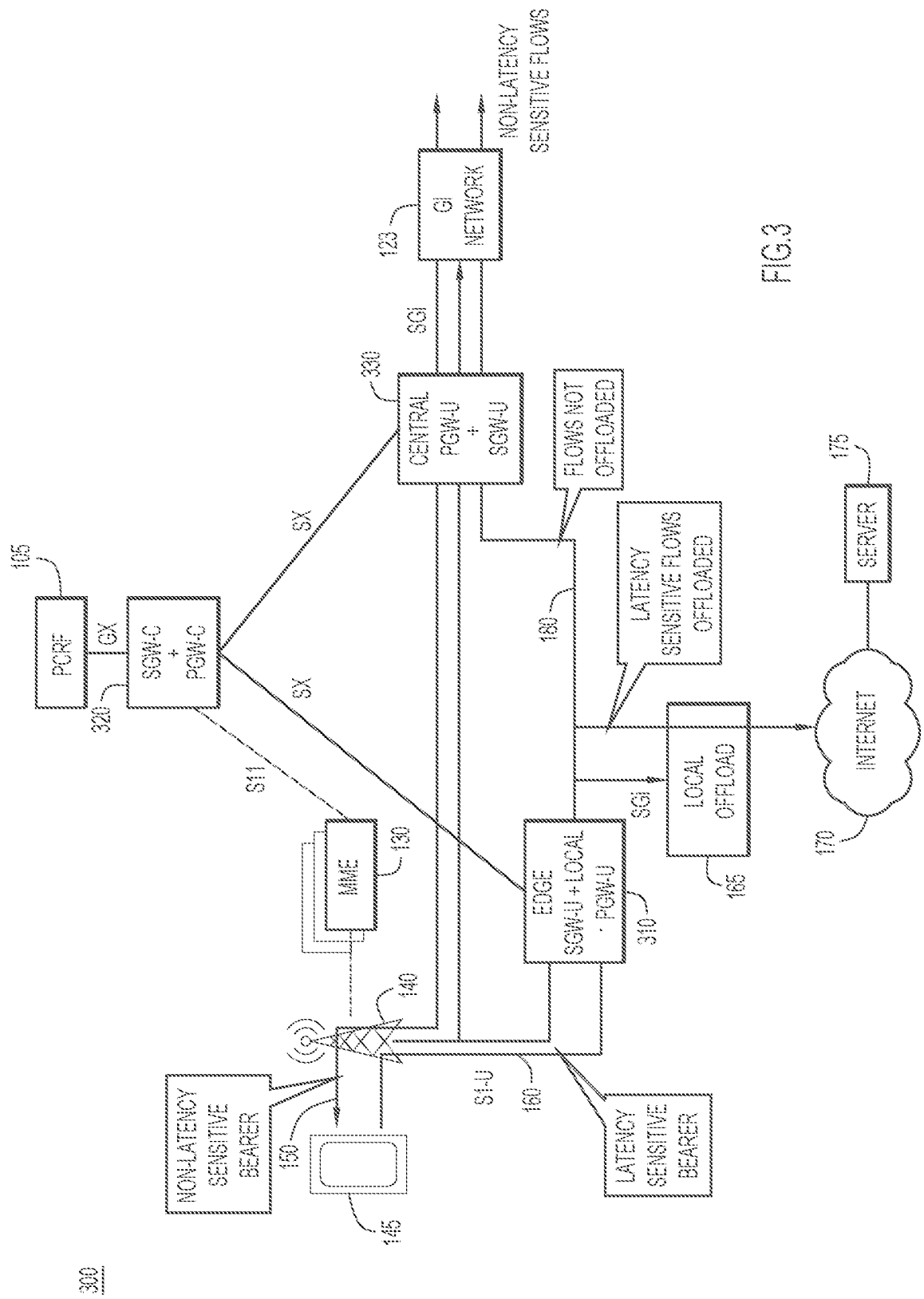
FIG. 3 is a block diagram of a mobile network architecture in which techniques are provided for MEC with low latency traffic segregation within a packet data network (PDN) using dedicated bearers, according to another example embodiment.

Reference is now made to FIG. 3. FIG. 3 shows a network architecture 300 similar to that of FIG. 3, in which techniques that provide MEC with low latency traffic segregation within a PDN using dedicated bearers may be implemented, according to another example embodiment. The difference in the network architecture of FIG. 3 is that an Edge SGW-U+Local PGW-U entity 310 is used instead of the Edge SGW-U 135, and the SGW-C 120 and PGW-C 125 are replaced with an integrated SGW-C+PGW-C entity 320. Moreover, the central SGW-U 110 and central PGW-U 115 are replaced with an integrated central PGW-U+SGW-U entity 330.

FIGS. 4A-4D illustrate a call flow for a process to enable segregated bearers in the network architecture shown 300 in FIG. 3. The call flow illustrated in 4A-4D is similar to that of FIGS. 2A-2C except that Edge SGW-U+Local PGW-U entity 310 is chosen for local/edge breakout. By integrating at the Edge SGW-U, the local-PGW-U functions, the Edge SGW-U+Local PGW-U entity 310 can do all of the local-PGW-U functions at the edge (charging, etc.) inline services, LI and other PGW features for the low latency traffic) at edge. This provides a benefit of providing Local-PGW features at the edge such as inline services, charging services, lawful intercept (LI) and other local-PGW features. The central SGW-U+PGW-U 330 remains the IP anchor.

Figure 4A:
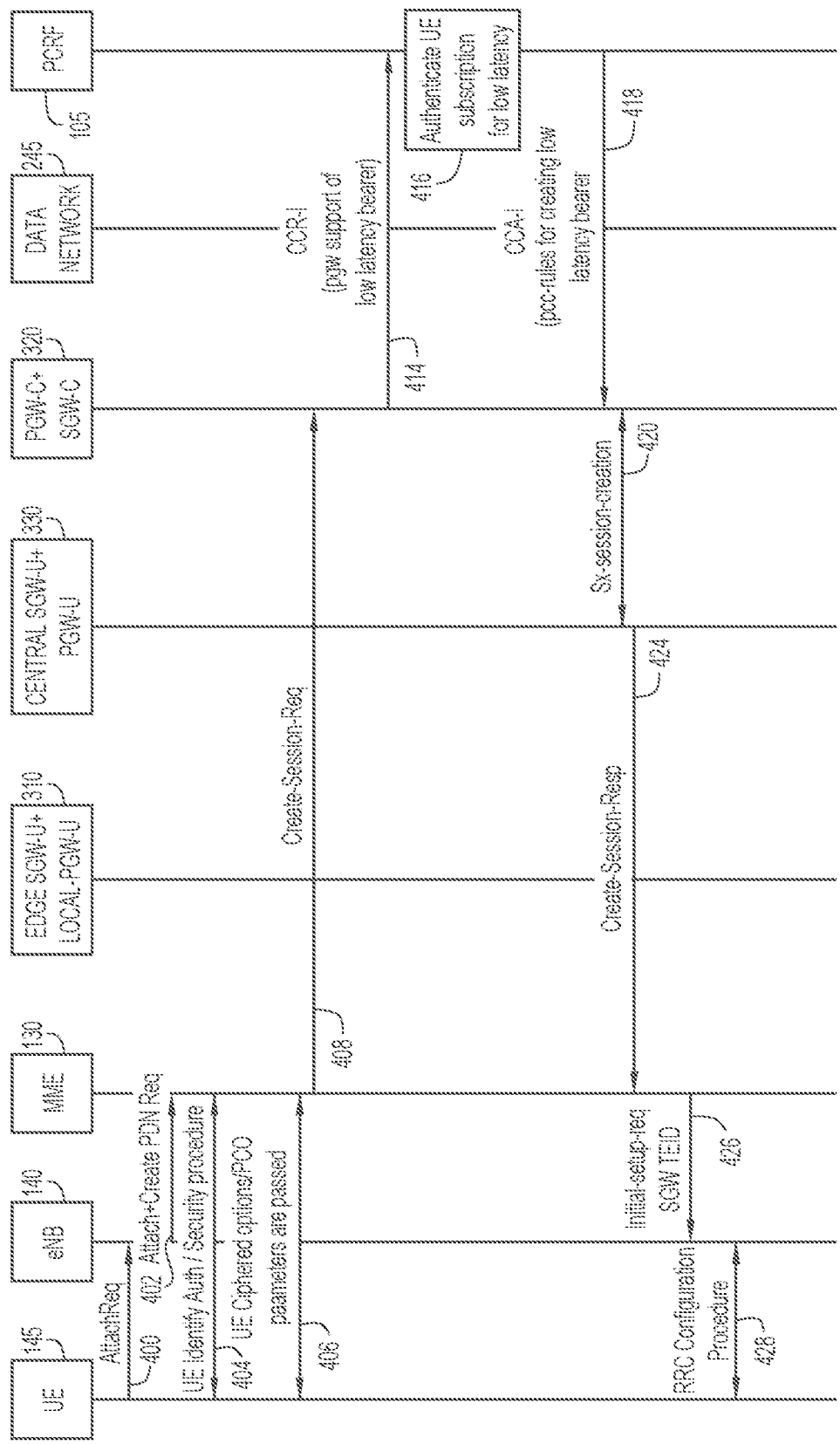
FIGS. 4A-4D illustrate a call flow for a process to enable segregation of low latency traffic on dedicated bearers in the mobile network architecture depicted in FIG. 3, according to an example embodiment.

Turning now to FIG. 4A, operations 400-408 are similar to operations 200-208 described above in connection with FIG. 2A, with the exception that the Create-Session Request is sent at 408 to the PGW-C+SGW-C entity 320. Operations 414, 416 and 418 are similar to operations 214, 216 and 218 of FIG. 2A, except involving the PGW-C+SGW-C 320 instead of the PGW-C 125 shown in FIG. 2A. Operations 420-438 are similar to operations 220-238 described above.

Figure 4B:
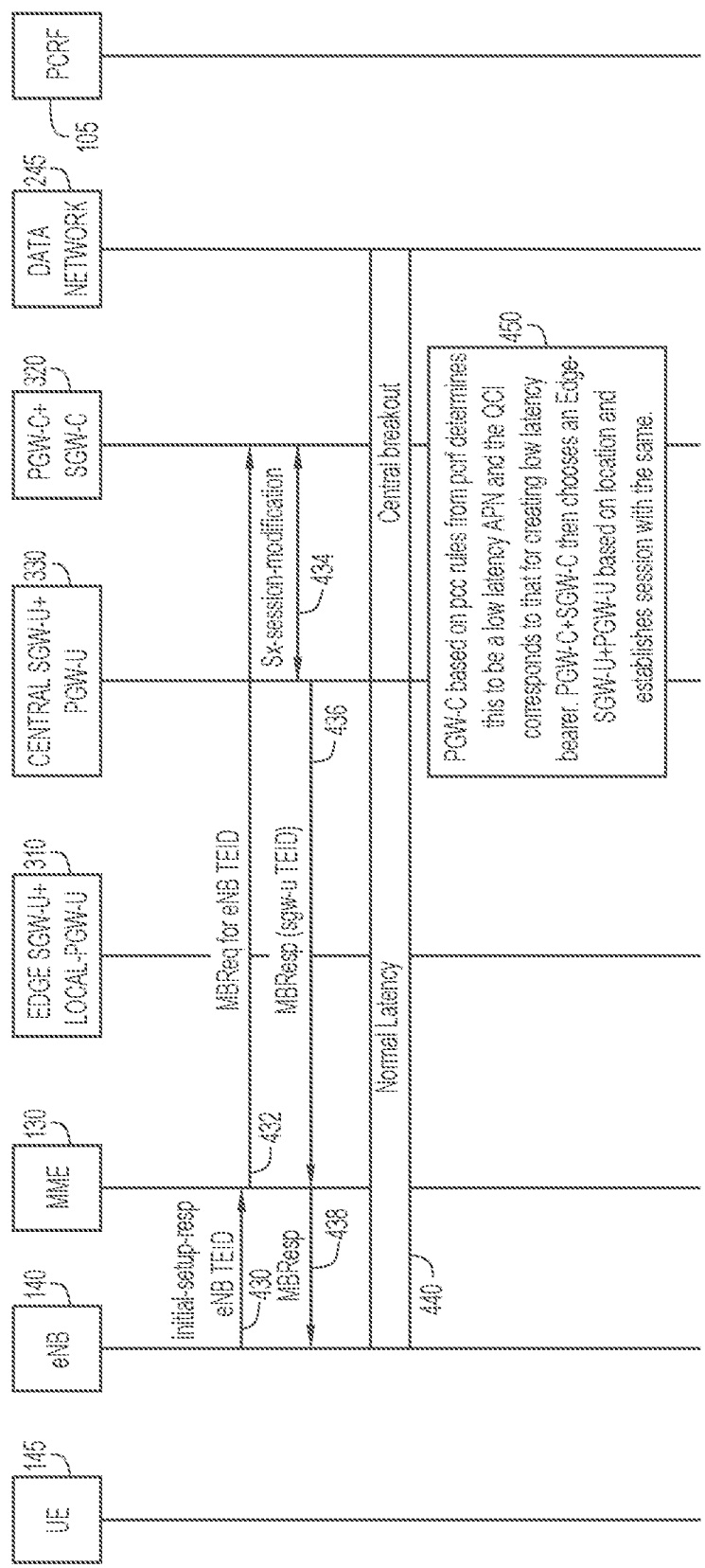

Normal latency bearer is shown at 440 in FIG. 4B, which is handled by a central breakout to the data network 245. At 450, the PGW-C+SGW-C 320 detects, based on PCC rules from the PCRF 105, an APN and QCI associated with a packet flow to be treated as low latency and thus the need to create a low latency designated bearer. The PGW-C+SGW-C 320 selects an Edge SGW-U+PGW-U, e.g., Edge SGW-U+PGW-U 310, based on location, and establishes a session with Edge SGW-U+PGW-U 310.

Figure 4C:
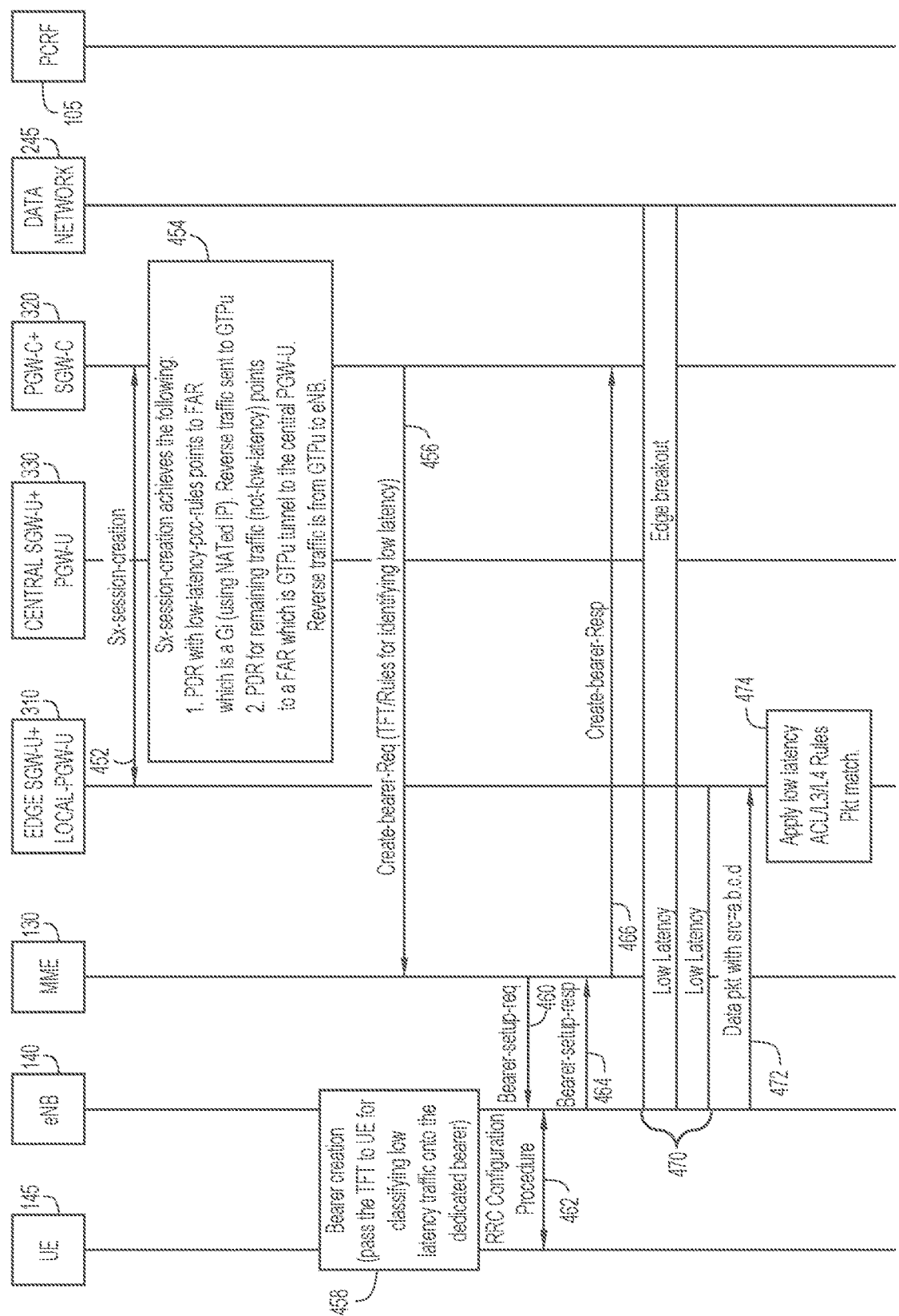

Turning now to FIG. 4C, the PGW-C+SGW-C 320 engages in an Sx Session-Creation with the Edge SGW-U+PGW-U 310, at 452. At 454, Sx Session-Create achieves:
1. Packet Detection Rule (PDR) with low latency PCC rules pointing to a FAR that is in a Gi Network using a Network Address Translated (NAT' ed) IP address. Reverse traffic back to the UE 145 is sent to the GPRS Tunneling Protocol User Plane (GTP-U) address.
2. The PDR for remaining traffic (not low-latency) points to a FAR which is a GTP-U tunnel to the central SGW-U+PGW-U 330. Reverse traffic is from the GTP-U to the eNB 140.

At 456, the PGW-C+SGW-C 320 sends a Create-Bearer request, including TFT rules for identifying low latency flows, to the MME 130. As shown at 458, the bearer creation results in passing the TFT rules to the UE for classifying low latency traffic onto the dedicated bearer.

Figure 4D:
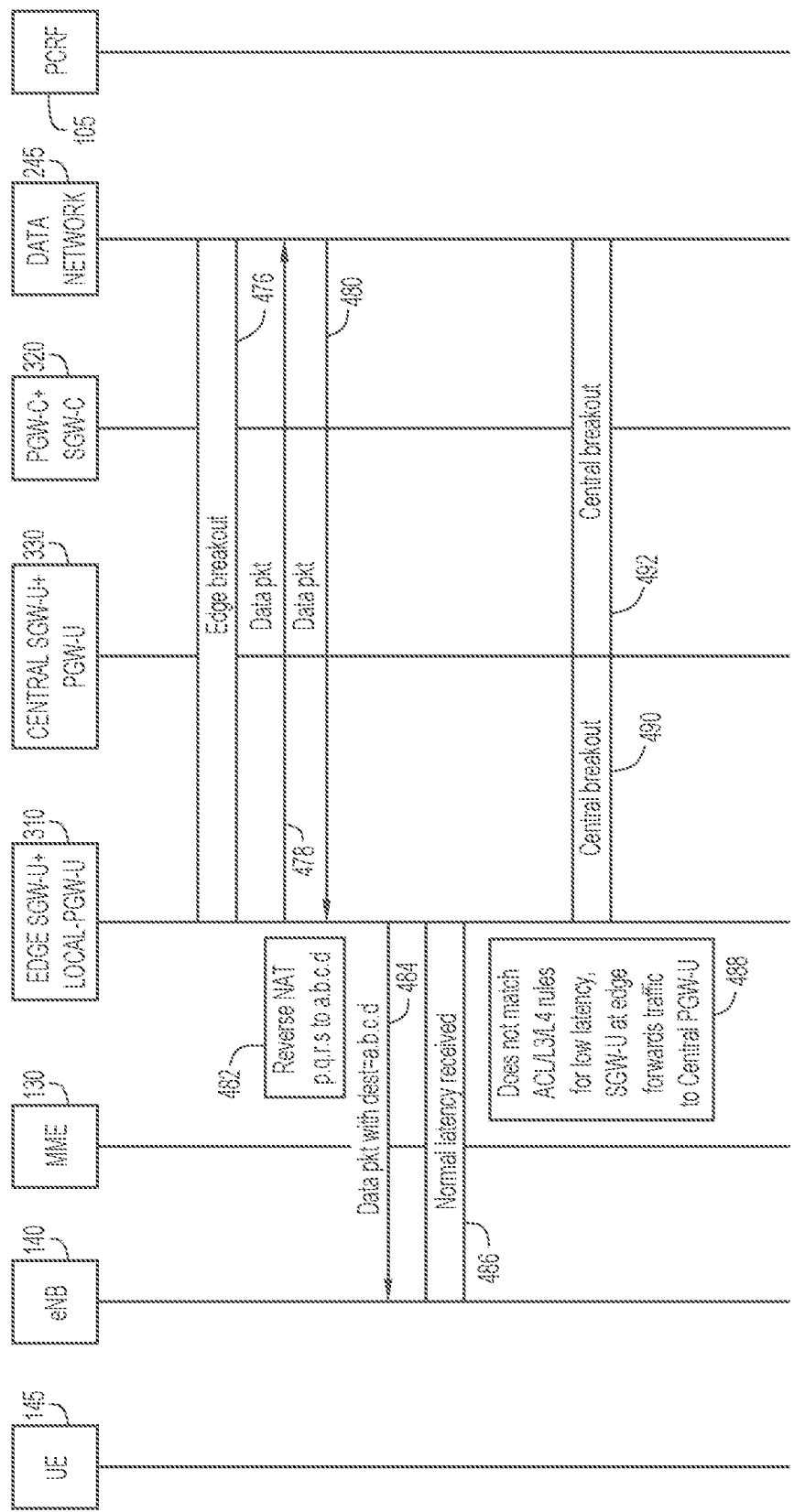

Operations 460-466 are similar to operations 260-268 in FIG. 2B. The designated low latency bearer is shown at 470, for locally breaking out low latency traffic at the Edge SGW-U+PGW-U 310. Operations 472-484 in FIGS. 4C and 4D are similar to operations 272-284 of FIGS. 2B and 2C, though the Edge SGW-U+PGW-U 310 is doing the local breakout of low latency traffic and the NAT for both forward and reverse direction low latency traffic. Normal latency traffic is handled by the Edge SGW-U+PGW-U 310 and the central SGW-U+PGW-U 330 at 486-492 in a manner similar to that at 286-292 as shown in FIG. 2C.

Figure 5:
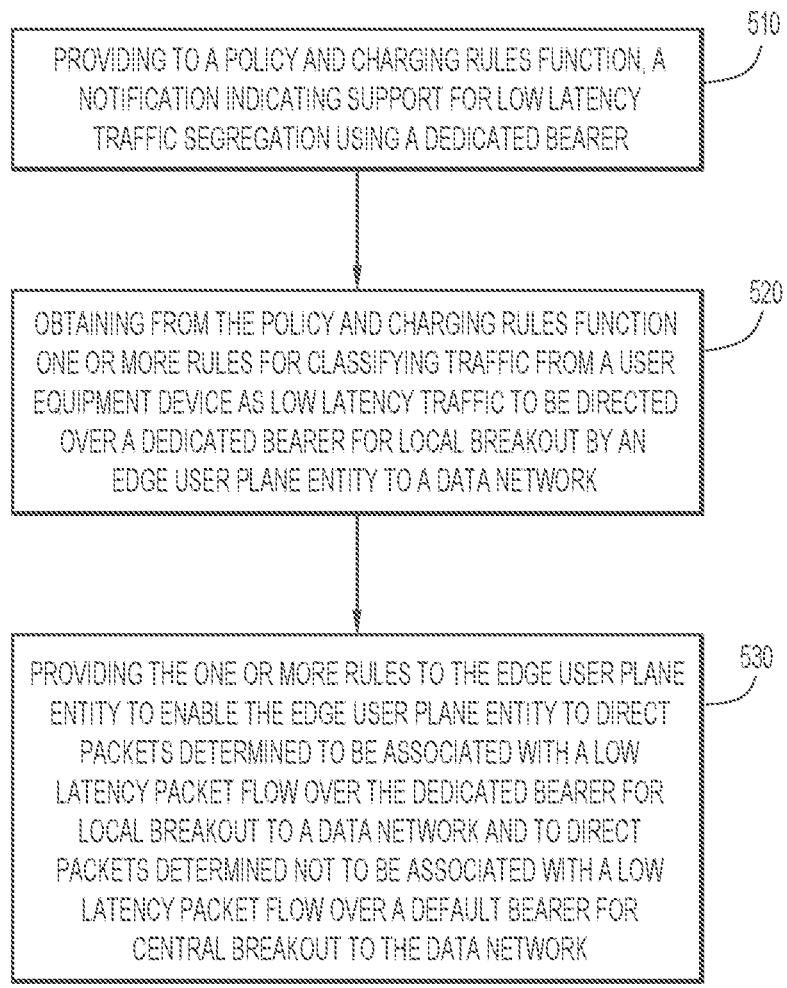
FIG. 5 is a flow chart depicting operations performed by a control plane entity to enable the segregation of low latency traffic on dedicated bearers in the mobile network architectures of FIGS. 1 and 3, according to an example embodiment.

Reference is made to FIG. 5 for a description of a method 500 performed by a control plane entity in a mobile network, e.g., the PGW-C 125 (shown in FIGS. 1, 2A-2C) or the PGW-C+SGW-C 320 (shown in FIGS. 3, 4A-4D). At 510, the control plane entity provides to a policy and charging rules function, a notification indicating support for low latency traffic segregation using a dedicated bearer. For example, this corresponds to operation 214 in FIG. 2A and operation 414 in FIG. 4A. At 520, the control plane entity obtains from the policy and charging rules function one or more rules for classifying traffic from a user equipment device as low latency traffic to be directed over a dedicated bearer for local breakout by an edge user plane entity to a data network. For example, this corresponds to operations 218 in FIG. 2A and operation 418 in FIG. 4A. At 530, the control plane entity provides the one or more rules to the edge user plane entity to enable the edge user plane entity to direct packets determined to be associated with a low latency packet flow over the dedicated bearer for local breakout to a data network and to direct packets determined not to be associated with a low latency packet flow over a default bearer for central breakout to the data network. For example, this corresponds to operations 250 and 254 in FIGS. 2A and 2B and operation 452 in FIG. 4C.

As described above, in one example, embodiment, the notification provided at 510 may include a private Attribute-Value-Pair in a Credit-Control-Request-Initial Request (CCR-I) message to enable the policy and charging rules function to authenticate a UE subscription for low latency traffic segregation. Similarly, in one embodiment, the one more rules are obtained from the policy and charging rules function in a Credit-Control-Answer message.

In one embodiment, as described above, the one or more rules may specify packet flow parameters in a form of an access control list, layer 3 parameters, and/or layer 4 parameters.

In one embodiment, the control plane entity is packet data network gateway, e.g., PGW-C 125 in FIGS. 1 and 2A-2C, and the providing operation 530 includes providing the one or more rules to a serving gateway, e.g., SGW-C 120, which in turn provides the one or more rules to the edge user plane entity.

In one embodiment, the control plane entity is an integrated packet data network gateway and serving gateway, e.g., the SGW-C+PGW-C 320 in FIGS. 3 and 4A-4D, and the edge user plane entity is an integrated serving gateway and packet data network gateway entity, e.g., the edge SGW-U+PGW-U 310 shown in FIGS. 3 and 4A-4D, wherein the providing operation 530 includes providing the one or more rules to the integrated serving gateway and packet data network gateway entity.

Figure 6:
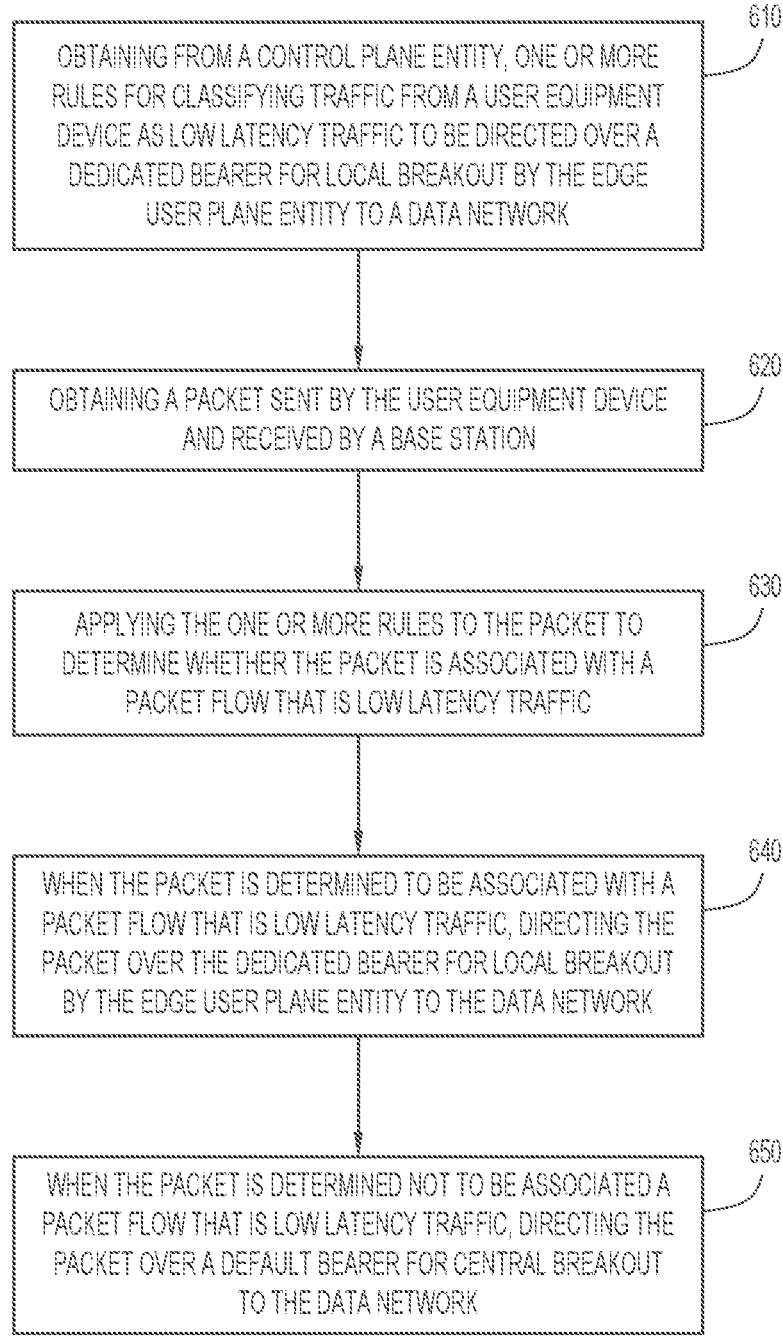
FIG. 6 is a flow chart depicting operations performed by an edge user plane entity to enable the segregation of low latency traffic on dedicated bearers in the mobile network architectures of FIGS. 1 and 3, according to an example embodiment.

Reference is now made to FIG. 6 for a description of a method 600 performed by an edge user plane entity in a mobile network, e.g., Edge SGW-U 135 in FIGS. 1 and 2A-2C, or Edge SGW-U+PGW-U 310 shown in FIGS. 3 and 4A-4D. At 610, the edge user plane entity obtains from a control plane entity, one or more rules for classifying traffic from a user equipment device as low latency traffic to be directed over a dedicated bearer for local breakout by the edge user plane entity to a data network. In one form, the one or more rules specify packet flow parameters in a form of an access control list, layer 3 parameters, and/or layer 4 parameters. At 620, the edge user plane entity obtains a packet sent by the user equipment device and received by a base station. At 630, the edge user plane entity applies the one or more rules to the packet to determine whether the packet is associated with a packet flow that is low latency traffic. At 640, when the edge user plane entity determines that the packet is associated with a packet flow that is low latency traffic, the edge user plane entity directs the packet over the dedicated bearer for local breakout by the edge user plane entity to the data network. Conversely, at 650, when the edge user plane entity determines that the packet is not associated with a packet flow that is low latency traffic, the edge user plane entity directs the packet over a default bearer for central breakout to the data network.

As described above in connection with FIGS. 2B and 4B, the edge user plane entity further defines a network address translation rule for the low latency traffic to replace a source address of packets determined to associated with a packet flow that is low latency traffic with an address of the edge user plane entity. Upon the edge user plane entity determining that the packet is associated with low latency traffic, the edge user plane entity performs network address translation on the packet in accordance with the network address translation rule to replace the source address of the packet with the address of the edge user plane entity prior to directing the packet over the dedicated bearer to the data network so that a return packet from the data network that is part of the packet flow is sent to the address of the edge user plane entity. Thus, the edge user plane entity further obtains the return packet from the data network, performs reverse network address translation on the return packet, and directs the return packet to the base station to be transmitted to the user equipment device.

Further still, as described above in connection with FIGS. 2B and 4B, the edge user plane entity provides the one or more rules to the base station which sends the one or more rules to the user equipment device to enable the user equipment device to classify packets as being associated with a packet flow that is low latency traffic to be directed over the dedicated bearer.

In one embodiment, the edge user plane entity is a serving gateway, e.g., SGW-U as shown in FIGS. 1 and 2A-2C. In another embodiment, the edge user plane entity is an integrated serving gateway and packet data network gateway, e.g., the edge SGW-U+PGW-U 310 shown in FIGS. 3 and 4A-4D. In this latter case, the integrated serving gateway and packet data network gateway performs one or more in-line services on the packet.

In one embodiment, the directing operation 650 involves directing the packet over the default bearer to a central user plane entity that forwards the packet to the data network. The central user plane entity may be an integrated serving gateway and packet data network gateway, e.g., the central SGW-U+PGW-U 330 shown in FIGS. 3 and 4A-4D.

In at least one embodiment for a 5G Standalone (SA) core, techniques described herein can be extended by allowing a Session Management Function (SMF) to have multiple User Plane Functions (UPFs) for a PDN, with one UPF being used for Low latency traffic and the other UPFs used for the rest of the traffic. Traffic from the UPF for low latency traffic can be offloaded at the edge, whereas the rest of the traffic can go to a centralized anchor UPF.

As compared with other MEC solutions, the techniques of the present embodiments do not have any UE dependency and can be implemented solely based on packet core changes. For example, SGW is modified to support multiple UPs for a PDN to anchor different dedicated bearers and support LBO.

In at least one embodiment, Access Pont Name-Aggregate Maximum Bit Rate (APN-AMBR) enforcement may still continue to be enforced at the PGW-U as it normally does, but it may apply only to the traffic sent to the centralized PGW-U. For the traffic offloaded at the edge SGW-U there will be no APN-AMBR enforcement or, if needed, there can be another APN-AMBR that can be separately enforced at the edge SGW-U. At the edge SGW-U, one technique for implementing offload may be to have another local PGW-U anchor the flows which are offloaded and, if needed, enforce a separate APN-AMBR for the offloaded flows. Similar features can be provided in S2a Mobility Over GTP Gateway (SAMOG-GW) solutions.

Further, the edge SGW-U can do flow offload based on, for example, some L3/L4 rules, and the offloaded flows can be anchored by the local PGW as may be provided in some SAMOG solutions. Some CUPS solutions may support a UP that can have a SAEGW (SGW+PGW) call in the same call as the CUPS UP. This is also possible in the techniques presented herein.

In various embodiments, benefits of the techniques presented herein may include, but not be limited to:
No changes to UE and no changes to MME.
Low latency traffic segregation in the same APN by using separate dedicated bearers.
Dedicated bearer carrying low latency traffic is anchored using edge UP.
Only traffic that needs low latency is handled by UP at the edge.
No need for a separate APN for low latency traffic.
Dynamically controlled based on SGW/PGW support and PCRF support without any UE dependency.
Controlled by Operator network using operator policy and subscription policy.
Inline Services, Charging functionality and LI provided at the edge.
PCC-rules based segregation possible with PGW at the edge.

In summary, techniques discussed herein provide a solution that ensures that it provides appropriate solution that allows operators to have ability to segregate within a PDN connection the low latency traffic from the rest of the non-latency sensitive traffic, so that only the genuine low latency traffic is processed on the edge User plane. Whereas the rest of the non-latency sensitive traffic goes to the User Plane that is centralized. Segregation can be provided in the same PDN splitting the low latency and non-low latency traffic amongst different dedicated bearers in which different User Planes are then used for low latency and non-latency traffic.

Figure 7:
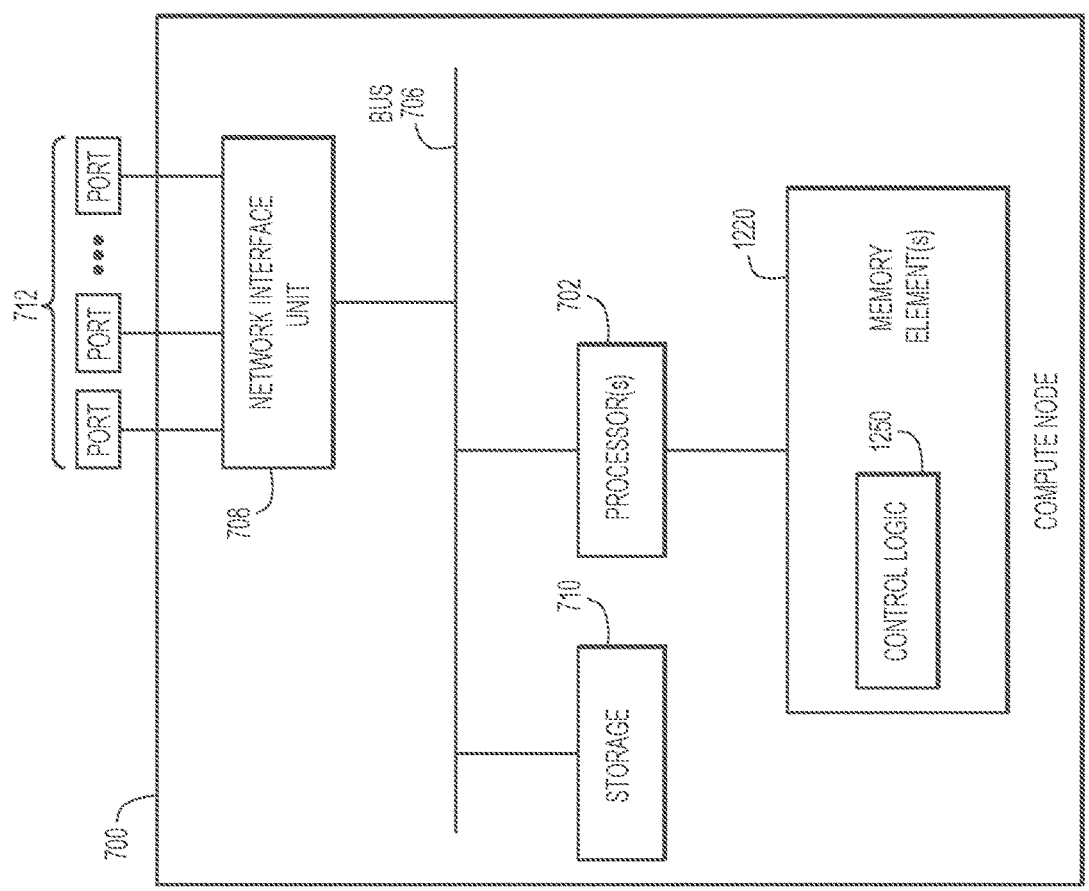
FIG. 7 is a simplified block diagram illustrating example details associated with a compute node for implementing operations described herein, according to an example embodiment.

Reference is now made to FIG. 7. FIG. 7 is a simplified block diagram illustrating example details associated with a compute node 700 for implementing operations described herein, according to an example embodiment. The embodiment of FIG. 6 illustrates compute node 700, which includes one or more processor(s) 702, one or more memory element(s) 704, a bus 706, a network interface unit 708, and storage 710. Memory element(s) 704 may include instructions for control logic 720 and may also include private extension information 722.

In various embodiments, compute node 700 can be implemented: as a data center compute node such as a server, rack of servers, multiple racks of servers, etc. for a data center; as a cloud compute node, which can be distributed across one or more data centers; as combinations thereof or the like. In various embodiments, one or more compute node(s) 700 can be used to realize elements of a mobile network. In various embodiments, processor(s) 702, memory element(s) 704, bus 706, network interface unit 708, storage 710 and logic, software, etc. configured for compute node 700 can represent hardware, software, and network resources, which can be abstracted into a 4G CUPS or any other implementation for a mobile network architecture comprising any number or instances of elements.

In at least one embodiment, processor(s) 702 is/are at least one hardware processor configured to execute various tasks, operations, and/or functions for compute node 700 as described herein according to software and/or instructions configured for compute node 700. In at least one embodiment, memory element(s) 704 is/are configured to store data, information, software and/or instructions associated with compute node 700 and logic configured for memory element(s) 704. In at least one embodiment, bus 706 can be configured as an interface that enables one or more elements of compute node 700 (e.g., network interface unit 708, processor(s) 702, memory element(s) 704 (and logic configured therein), etc. to communicate in order to exchange information and/or data. In at least one embodiment, a fast kernel-hosted interconnect may be employed for compute node 700, potentially using shared memory between processes (e.g., VNFs, etc.), which can enable efficient communication paths between the processes. In various embodiments, network interface unit 708 enables communication between compute node 700 and other compute nodes, via one or more ports 712 at which traffic is received and transmitted to facilitate operations discussed for various embodiments described herein. In some embodiments, network interface unit 708 can be configured with one or more Ethernet driver(s) and/or controller(s) or other similar network interface driver(s) and/or controller(s) to enable communications for compute node 700 within a mobile network. Compute node 700 can include any suitable interfaces for receiving, transmitting, and/or otherwise communicating data or information in a network environment.

In various embodiments, storage 710 can be configured to store data, information and/or instructions associated with compute node 700 and/or logic configured for memory element(s) 704. Note that in certain examples, storage 710 can be consolidated with memory elements 704 (or vice versa), and/or the storage/memory elements can overlap/exist in any other suitable manner.

In at least one embodiment, control logic 720 can include instructions that, when executed (e.g., by processor(s) 702), cause compute node 700 to perform operations, which can include, but not be limited to providing control operations for compute node 700, cooperating and/or interacting with other logic; maintaining and/or interacting with stored data, information, parameters (e.g., memory element(s), storage, data structures, databases, tables, etc.); combinations thereof; and/or the like to facilitate any operations as discussed for various embodiments described herein.

In various embodiments, memory element(s) 704 may include any suitable memory element such as random access memory (RAM), dynamic RAM (DRAM), static RAM (SRAM), and cache memory. In general, memory element(s) 704 can include any suitable volatile or non-volatile computer readable storage media, which may be inclusive of non-transitory tangible media and/or non-transitory computer readable storage media that is capable of storing program/logic/software instructions and/or digital information.

In various embodiments, storage 710 may include any suitable storage such as persistent storage, which may be a magnetic disk drive, a solid state hard drive, a semiconductor storage device, read only memory (ROM), an erasable programmable read only memory (EPROM), flash memory, or any other computer readable storage media, which may be inclusive of non-transitory tangible media and/or non-transitory computer readable storage media, that is capable of storing program/logic/software instructions and/or digital information. In some embodiments, the media used by storage 710 may also be removable. For example, a removable hard drive may be used for storage 710. Other examples include optical and magnetic disks, thumb drives, and smart cards that are inserted into a drive for transfer onto another computer readable storage medium that is also part of storage 710.

In summary, as illustrated by the embodiments of FIGS. 1, 2A-2C, 3, 4A-4D, and 5-7, techniques as discussed herein provide a solution that ensures that operators to have ability to segregate, within a PDN connection the low latency traffic, from the rest of the non-latency sensitive traffic, so that only the genuine low latency traffic is processed on the edge User plane. Whereas the rest of the non-latency sensitive traffic goes to the User Plane that is centralized. Segregation can be provided in the same PDN by splitting the low latency and non-low latency traffic amongst different dedicated bearers. Different User Planes are then used for low latency and non-latency traffic.

In one form, a method is provided comprising: at an edge user plane entity in a mobile network, obtaining from a control plane entity, one or more rules for classifying traffic from a user equipment device as low latency traffic to be directed over a dedicated bearer for local breakout by the edge user plane entity to a data network; obtaining a packet sent by the user equipment device and received by a base station; applying the one or more rules to the packet to determine whether the packet is associated with a packet flow that is low latency traffic; when the packet is determined to be associated with a packet flow that is low latency traffic, directing the packet over the dedicated bearer for local breakout by the edge user plane entity to the data network; and when the packet is determined not to be associated a packet flow that is low latency traffic, directing the packet over a default bearer for central breakout to the data network.

In addition, a method is provided comprising: at a control plane entity in a mobile network, providing to a policy and charging rules function, a notification indicating support for low latency traffic segregation using a dedicated bearer; obtaining from the policy and charging rules function one or more rules for classifying traffic from a user equipment device as low latency traffic to be directed over a dedicated bearer for local breakout by an edge user plane entity to a data network; and providing the one or more rules to the edge user plane entity to enable the edge user plane entity to direct packets determined to be associated with a low latency packet flow over the dedicated bearer for local breakout to a data network and to direct packets determined not to be associated with a low latency packet flow over a default bearer for central breakout to the data network.

In still another form, an apparatus is provided comprising: a communication interface configured to enable communications in a mobile network; a memory; a processor coupled to the communication interface and the memory, wherein the processor is configured to perform operations including: obtaining from a control plane entity, one or more rules for classifying traffic from a user equipment device as low latency traffic to be directed over a dedicated bearer for local breakout by apparatus to a data network; obtaining a packet sent by the user equipment device and received by a base station; applying the one or more rules to the packet to determine whether the packet is associated with a packet flow that is low latency traffic; when the packet is determined to be associated with a packet flow that is low latency traffic, directing the packet over the dedicated bearer for local breakout by the apparatus to the data network; and when the packet is determined not to be associated a packet flow that is low latency traffic, directing the packet over a default bearer for central breakout to the data network.

In still another form, an apparatus is provided comprising: a communication interface configured to enable communications in a mobile network; a memory; a processor coupled to the communication interface and the memory, wherein the processor is configured to perform operations including: providing to a policy and charging rules function, a notification indicating support for low latency traffic segregation using a dedicated bearer; obtaining from the policy and charging rules function one or more rules for classifying traffic from a user equipment device as low latency traffic to be directed over a dedicated bearer for local breakout by an edge user plane entity to a data network; and providing the one or more rules to the edge user plane entity to enable the edge user plane entity to direct packets determined to be associated with a low latency packet flow over the dedicated bearer for local breakout to a data network and to direct packets determined not to be associated with a low latency packet flow over a default bearer for central breakout to the data network.

In yet another form, one or more non-transitory computer readable storage media are provided that are encoded with software instructions that, when executed by a processor, cause the processor to perform operations including: at an edge user plane entity in a mobile network, obtaining from a control plane entity, one or more rules for classifying traffic from a user equipment device as low latency traffic to be directed over a dedicated bearer for local breakout by the edge user plane entity to a data network; obtaining a packet sent by the user equipment device and received by a base station; applying the one or more rules to the packet to determine whether the packet is associated with a packet flow that is low latency traffic; when the packet is determined to be associated with a packet flow that is low latency traffic, directing the packet over the dedicated bearer for local breakout by the edge user plane entity to the data network; and when the packet is determined not to be associated a packet flow that is low latency traffic, directing the packet over a default bearer for central breakout to the data network.

In yet another form, one or more non-transitory computer readable storage media are provided that are encoded with software instructions that, when executed by a processor, cause the processor to perform operations including: at a control plane entity in a mobile network, providing to a policy and charging rules function, a notification indicating support for low latency traffic segregation using a dedicated bearer; obtaining from the policy and charging rules function one or more rules for classifying traffic from a user equipment device as low latency traffic to be directed over a dedicated bearer for local breakout by an edge user plane entity to a data network; and providing the one or more rules to the edge user plane entity to enable the edge user plane entity to direct packets determined to be associated with a low latency packet flow over the dedicated bearer for local breakout to a data network and to direct packets determined not to be associated with a low latency packet flow over a default bearer for central breakout to the data network.

The operations described herein may be identified based upon the application for which they are implemented in a specific embodiment. However, it should be appreciated that any particular operation nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The environment of the present embodiments may include any number of computer, compute node, or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Note that in certain example implementations, operations as outlined herein may be implemented by logic encoded in one or more tangible media, which may be inclusive of non-transitory tangible media and/or non-transitory computer readable storage media (e.g., embedded logic provided in an application specific integrated circuit (ASIC), in digital signal processing (DSP) instructions, software [potentially inclusive of object code and source code] to be executed by a processor, or other similar machine, etc.). In some of these instances, a memory element or storage can store data used for operations described herein. This includes memory elements or storage being able to store software, logic, code, and/or processor instructions that are executed to carry out operations described herein. A processor (e.g., a hardware processor) can execute any type of instructions associated with data to achieve the operations detailed herein. In one example, a processor may transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM), or an ASIC that includes digital logic, software, code, electronic instructions, or any suitable combination thereof.

In one example implementation, a compute node can encompass network appliances, routers, servers, switches, gateways, bridges, load balancers, firewalls, processors, modules, or any other suitable device, component, element, or object operable to exchange information that facilitates or otherwise helps to facilitate various operations as described for various embodiments discussed herein in a network environment (e.g., for networks such as discussed herein).

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Elements and/or systems discussed for various embodiments described herein can couple to one another through simple interfaces (as illustrated) and/or through any other suitable connection (wired or wireless), which provides a viable pathway for network communications. As referred to herein, a physical (wired or wireless) interconnection or interface can refer to an interconnection of one element with one or more other element(s), while a logical interconnection or interface can refer to communications, interactions and/or operations of elements with each other, which can be directly or indirectly interconnected, in a network environment. Additionally, any one or more of the elements and/or systems may be combined or removed from a given deployment based on a particular configuration and/or implementation.

In various embodiments, a mobile network may implement user datagram protocol/Internet Protocol (UDP/IP) connections and/or transmission control protocol/IP (TCP/IP) communication language protocol in particular embodiments of the present disclosure. However, a mobile network can alternatively implement any other suitable communication protocol, interface and/or standard, proprietary and/or non-proprietary, for transmitting and receiving messaging and/or signaling. Other protocols, interfaces and/or communication standards that can be used in a mobile network can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), Simple Object Access Protocol (SOAP), SOAP over Hypertext Transfer Protocol (HTTP), Representational State Transfer (REST), combinations thereof or the like. In some embodiments, secure communications can be facilitated using TCP/IP Secure Sockets Layer (SSL) communications.

In various embodiments, a mobile network can represent a series of points or elements of interconnected communication paths (wired or wireless) for receiving and transmitting packets of information that propagate through a mobile network. In various embodiments, a mobile network can be associated with and/or provided by a single network operator or service provider and/or multiple network operators or service providers. In various embodiments, a mobile network can include and/or overlap with, in whole or in part, one or more packet data network(s). A mobile network may offer communicative interfaces between various elements of a mobile network and may be associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment A communication system, such as a mobile network, through which communications propagate in can use any suitable technologies for communication including wireless (e.g., 3G/4G/5G/NG network, Institute of Electrical and Electronics Engineers (IEEE) Standard 802.11™-2012, published Mar. 29, 2012 (e.g., WiFi), WiMax, IEEE Standard 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein can be inclusive of an executable file comprising instructions that can be understood and processed on a computer, processor, machine, compute node, combinations thereof, or the like and may further include library modules loaded during execution, object files, system files, hardware logic, software logic, and/or any other executable modules.

The embodiments presented may be implemented in various forms, such as a system, a method, and/or a computer program product at any possible technical detail level of integration. The computer program product may include a non-transitory computer readable storage medium (or media) having computer readable program instructions thereon for causing a processor to carry out aspects of operations presented herein.

It is also important to note that the operations and steps described with reference to the preceding figures illustrate only some of the possible scenarios that may be executed by, or within, a system or network. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or routing protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
at a control plane entity in a mobile network, providing to a policy and charging rules function, a notification indicating support for low latency traffic segregation using a dedicated bearer;
obtaining, from the policy and charging rules function, one or more rules for classifying traffic from a user equipment device as low latency traffic to be directed over the dedicated bearer for a local breakout by an edge user plane entity to a data network, wherein the one or more rules include a low latency traffic rule specific to the low latency traffic using the dedicated bearer and a network address translation rule for replacing a source address of packets determined to be associated with a low latency packet flow with an address of the edge user plane entity for the low latency traffic during a network address translation; and
providing the one or more rules, to the edge user plane entity, to enable the edge user plane entity to direct the packets determined to be associated with the low latency packet flow over the dedicated bearer for the local breakout to the data network and to direct the packets determined not to be associated with the low latency packet flow over a default bearer for a central breakout to the data network.

2. The method of claim 1, wherein the notification includes a private Attribute-Value-Pair in a Credit-Control-Request-Initial Request (CCR-I) message to enable the policy and charging rules function to authenticate a user equipment subscription for the low latency traffic segregation.

3. The method of claim 2, wherein obtaining, from the policy and charging rules function, the one or more rules includes obtaining policy and charging control rules in a Credit-Control-Answer message, each of the policy and charging control rules having an indication in the private Attribute-Value-Pair of being the low latency traffic rule.

4. The method of claim 1, wherein providing the one or more rules to the edge user plane entity includes:
providing the one or more rules to different dedicated bearers of different respective edge user plane entities, each of the different respective edge user plane entities anchoring the different dedicated bearers each associated with the low latency traffic.

5. The method of claim 1, wherein the control plane entity is packet data network gateway and providing the one or more rules to the edge user plane entity includes:
providing the one or more rules to a serving gateway which in turn provides the one or more rules to the edge user plane entity.

6. The method of claim 1, wherein the control plane entity is an integrated packet data network gateway and serving gateway, and the edge user plane entity is an integrated serving gateway and packet data network gateway entity and wherein providing the one or more rules includes:
providing the one or more rules to the integrated serving gateway and packet data network gateway entity.

7. The method of claim 1, wherein the one or more rules specify packet flow parameters in a form of an access control list, layer 3 parameters, and/or layer 4 parameters.

8. The method of claim 1, wherein the low latency traffic rule includes a private extension with an indication of a rule pertaining to the dedicated bearer handling the low latency traffic, the dedicated bearer for the local breakout is anchored by an edge user plane software gateway and the default bearer for the central breakout is anchored by a central user plane software gateway.

9. The method of claim 1, wherein the notification is provided by the control plane entity in a private Attribute-Value-Pair while setting up the default bearer and the one or more rules specify packet flow parameters in a form of an access control list and layer 4 parameters.

10. An apparatus comprising:
a communication interface configured to enable communications in a mobile network;
a memory; and
a processor coupled to the communication interface and the memory, wherein the processor is configured to perform operations including:
providing to a policy and charging rules function, a notification indicating support for low latency traffic segregation using a dedicated bearer,
obtaining, from the policy and charging rules function, one or more rules for classifying traffic from a user equipment device as low latency traffic to be directed over the dedicated bearer for a local breakout by an edge user plane entity to a data network, wherein the one or more rules include a low latency traffic rule specific to the low latency traffic using the dedicated bearer and a network address translation rule for replacing a source address of packets determined to be associated with a low latency packet flow with an address of the edge user plane entity for the low latency traffic during a network address translation; and
providing the one or more rules, to the edge user plane entity, to enable the edge user plane entity to direct the packets determined to be associated with the low latency packet flow over the dedicated bearer for the local breakout to the data network and to direct the packets determined not to be associated with the low latency packet flow over a default bearer for a central breakout to the data network.

11. The apparatus of claim 10, wherein the notification includes a private Attribute-Value-Pair in a Credit-Control-Request-Initial Request (CCR-I) message to enable the policy and charging rules function to authenticate a user equipment subscription for the low latency traffic segregation.

12. The apparatus of claim 11, wherein the processor is configured to obtain from the policy and charging rules function the one or more rules in a Credit-Control-Answer message.

13. The apparatus of claim 10, wherein the processor is configured to provide the one or more rules to the edge user plane entity by:
providing the one or more rules to different dedicated bearers of different respective edge user plane entities, each of the different respective edge user plane entities anchoring the different dedicated bearers each associated with the low latency traffic.

14. The apparatus of claim 10, wherein the apparatus is a packet data network gateway and the processor is configured to provide the one or more rules to the edge user plane entity by:
providing the one or more rules to a serving gateway which in turn provides the one or more rules to the edge user plane entity.

15. The apparatus of claim 10, wherein the apparatus is an integrated packet data network gateway and serving gateway, and the edge user plane entity is an integrated serving gateway and packet data network gateway entity and wherein the processor is configured to provide the one or more rules by:
providing the one or more rules to the integrated serving gateway and packet data network gateway entity.

16. The apparatus of claim 10, wherein the one or more rules specify packet flow parameters in a form of an access control list, layer 3 parameters, and/or layer 4 parameters.

17. One or more non-transitory computer readable storage media encoded with instructions that, when executed by a processor associated with a control plane entity in a mobile network, cause the processor to perform operations including:
providing to a policy and charging rules function, a notification indicating support for low latency traffic segregation using a dedicated bearer;
obtaining, from the policy and charging rules function, one or more rules for classifying traffic from a user equipment device as low latency traffic to be directed over the dedicated bearer for a local breakout by an edge user plane entity to a data network, wherein the one or more rules include a low latency traffic rule specific to the low latency traffic using the dedicated bearer and a network address translation rule for replacing a source address of packets determined to be associated with a low latency packet flow with an address of the edge user plane entity for the low latency traffic during a network address translation; and providing the one or more rules, to the edge user plane entity, to enable the edge user plane entity to direct the packets determined to be associated with the low latency packet flow over the dedicated bearer for the local breakout to the data network and to direct the packets determined not to be associated with the low latency packet flow over a default bearer for a central breakout to the data network.

18. The non-transitory computer readable storage media of claim 17, wherein the notification includes a private Attribute-Value-Pair in a Credit-Control-Request-Initial Request (CCR-I) message to enable the policy and charging rules function to authenticate a user equipment subscription for the low latency traffic segregation.

19. The non-transitory computer readable storage media of claim 18, wherein the instructions cause the processor to obtain, from the policy and charging rules function, the one or more rules in a Credit-Control-Answer message.

20. The non-transitory computer readable storage media of claim 17, wherein the instructions cause the processor to provide the one or more rules to the edge user plane entity by:

providing the one or more rules to different dedicated bearers of different respective edge user plane entities, each of the different respective edge user plane entities anchoring the different dedicated bearers each associated with the low latency traffic.

* * * * *